(12) United States Patent
Ishida et al.

(10) Patent No.: US 7,797,716 B2
(45) Date of Patent: Sep. 14, 2010

(54) RECORDING APPARATUS AND RECORDING RESERVATION PROCESSING METHOD

(75) Inventors: Masaki Ishida, Kanagawa (JP); Hitoshi Kimura, Kanagawa (JP)

(73) Assignee: Sony Corporation (JP)

( * ) Notice: Subject to any disclaimer, the term of this patent is extended or adjusted under 35 U.S.C. 154(b) by 759 days.

(21) Appl. No.: 10/533,032

(22) PCT Filed: Sep. 1, 2004

(86) PCT No.: PCT/JP2004/013008

§ 371 (c)(1),
(2), (4) Date: Apr. 26, 2005

(87) PCT Pub. No.: WO2005/022907

PCT Pub. Date: Mar. 10, 2005

(65) Prior Publication Data

US 2006/0153523 A1 Jul. 13, 2006

(30) Foreign Application Priority Data

Sep. 1, 2003 (JP) ............................. 2003-308499

(51) Int. Cl.
*H04N 5/445* (2006.01)
*H04N 7/173* (2006.01)
*H04N 7/16* (2006.01)
*H04N 5/91* (2006.01)

(52) U.S. Cl. .................. 725/58; 725/134; 725/142; 386/46

(58) Field of Classification Search .................. 725/57, 725/58, 134, 142; 386/46
See application file for complete search history.

(56) References Cited

U.S. PATENT DOCUMENTS 5,379,153 A 1/1995 Ishii et al.

(Continued)

FOREIGN PATENT DOCUMENTS

EP 1161087 A2 12/2001

(Continued)

OTHER PUBLICATIONS

Supplementary European Search Report, EP 04772880, dated Jun. 26, 2009.

*Primary Examiner*—James Sheleheda
(74) *Attorney, Agent, or Firm*—Lerner, David, Littenberg, Krumholz & Mentlik, LLP

(57) ABSTRACT

A recording apparatus is disclosed which includes first through n-th recording means for recording input broadcast contents to a recording medium. When a user designates a reservation of a broadcast content recording, the apparatus automatically selects one of the recording means so as to make the recording reservation to the selected recording means. If any such recording means cannot be selected automatically, i.e., if recording reservations have already been made to all recording means for a time slot corresponding to the reservation desired to be made anew, then the user is asked to select particular recording means for the reservation. A recording reservation made to one recording means may be switched automatically to another recording means as needed. That is, any recording reservation after being made may be switched from one recording means to another before actual execution of the recording, in order to reflect the status of other recording reservations that have been made since. These arrangements enhance the user's ease of operation and help to build an advantageous setup for recording reservation management.

9 Claims, 17 Drawing Sheets

U.S. PATENT DOCUMENTS

| | | | |
|---|---|---|---|
| 6,344,878 B1 * | 2/2002 | Emura ........................ | 348/460 |
| 6,493,876 B1 * | 12/2002 | DeFreese et al. ............ | 725/100 |
| 7,123,813 B2 * | 10/2006 | Inoue .......................... | 386/46 |
| 7,164,843 B2 * | 1/2007 | Wada .......................... | 386/46 |
| 7,369,750 B2 * | 5/2008 | Cheng et al. ................ | 386/83 |
| 2001/0004418 A1 | 6/2001 | Nagano et al. | |
| 2001/0041046 A1 | 11/2001 | Wada | |
| 2003/0154484 A1 | 8/2003 | Plourde et al. | |

FOREIGN PATENT DOCUMENTS

| | | |
|---|---|---|
| EP | 1187467 A2 | 3/2002 |
| JP | 10-341381 A | 12/1998 |
| JP | 2000-354221 A | 12/2000 |
| JP | 2001-160256 A | 6/2001 |
| JP | 2001-167521 A | 6/2001 |
| JP | 2001-319419 A | 11/2001 |
| JP | 2002-152639 A | 5/2002 |
| JP | 2003-198999 A | 7/2003 |

* cited by examiner

FIG. 4

MAKING NEW RECORDING RESERVATIONS

| DATE | STARTING TIME | | ENDING TIME | CHANNEL |
|---|---|---|---|---|
| AUG 15 (FRI) | 7:00PM | — | 11:50PM | CH1 |

OK    BACK

MAKE YOUR CHOICES USING ARROW (← ↓ ↑ →) KEYS, AND FINALIZE YOUR SELECTION BY CLICKING ON (OK) KEY.

[SCREEN ON WHICH THE USER MAKES RECORDING RESERVATIONS]

FIG. 5

VERIFYING OVERLAPPING RECORDING RESERVATIONS

THE RECORDING RESERVATIONS BELOW OVERLAP WITH ONE ANOTHER.
DO YOU WANT TO CANCEL ANY RESERVATION IN RECORDING BLOCK A OR B
TO MAKE THE NEW RESERVATION?

A
- AUG 10 (SUN)  9:00PM   TBSS         ORIGINAL 
- AUG 10 (SUN) 10:00PM   SHIN-NIHON TV VISITING THE WORLD
- AUG 10 (SUN) 11:00PM   TV MAIASA    HIGHLIGHTS OF
                                      HIGH-SCHOOL BASEBALL AT KOSHIEN B
- AUG 10 (SUN)  9:00PM   SHIN-NIHON TV BUSINESS CONSULTANT WITH
                                       LONG WAITING LISTS ( CANCEL A TO MAKE RESERVATION )   ( CANCEL B TO MAKE RESERVATION )   ( BACK )

MAKE YOUR CHOICES USING ARROW (←→) KEYS, AND CLICK ON WHAT IS SELECTED.
SCROLL DISPLAY USING ARROW (↓↑) KEYS.

[SCREEN FOR PRESENTING THE USER WITH OVERLAPPING RECORDING RESERVATIONS IN
EACH RECORDING BLOCK]

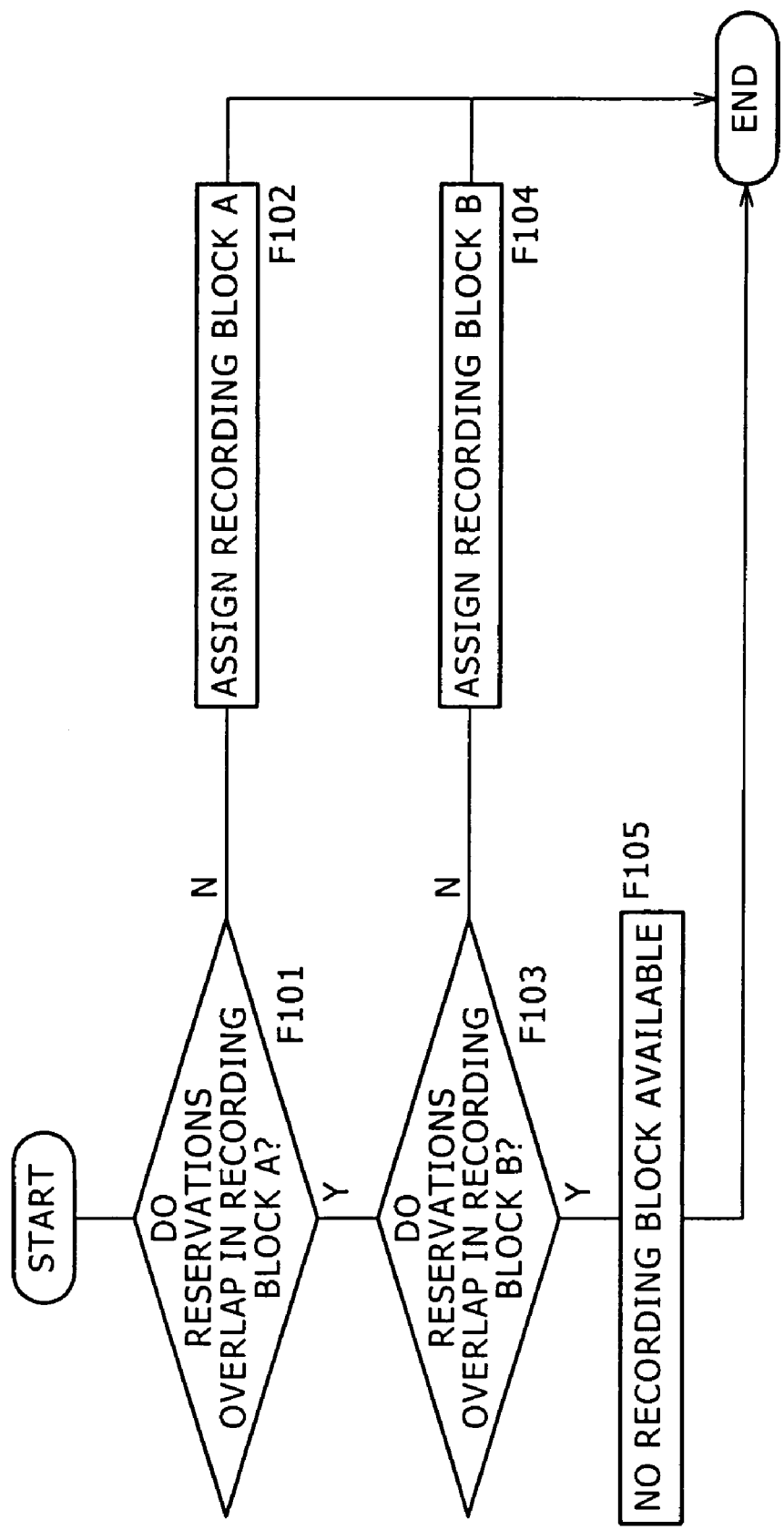

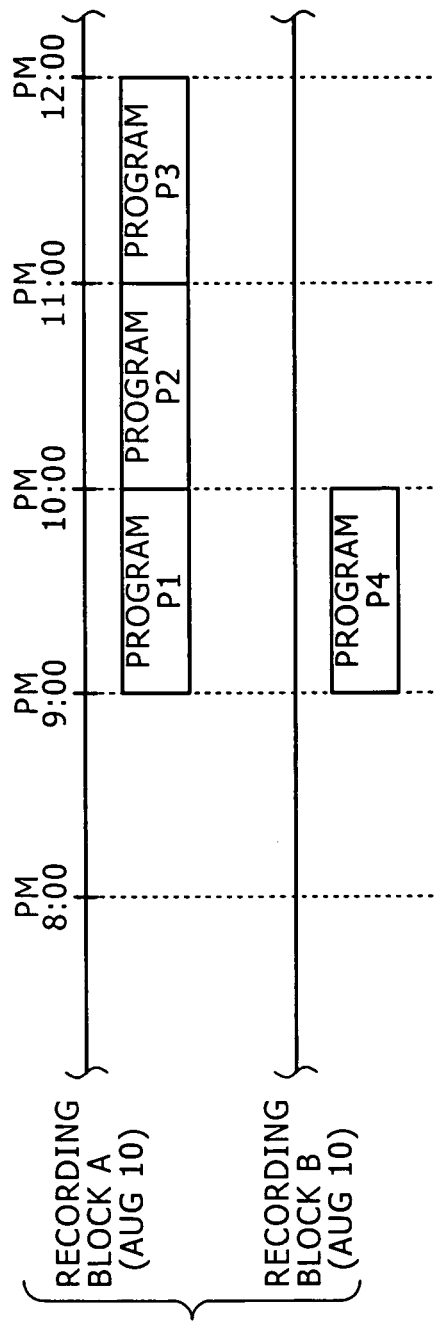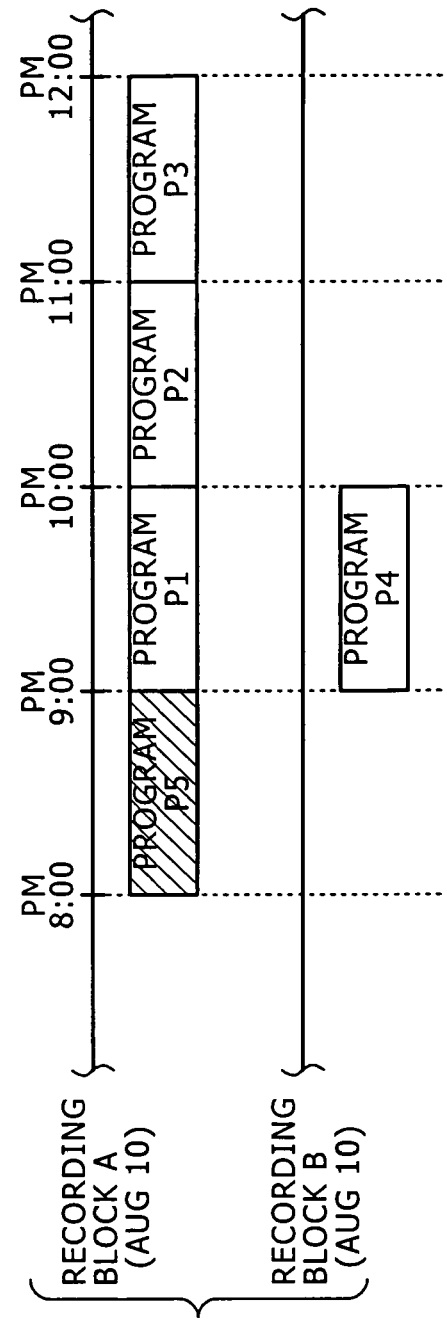

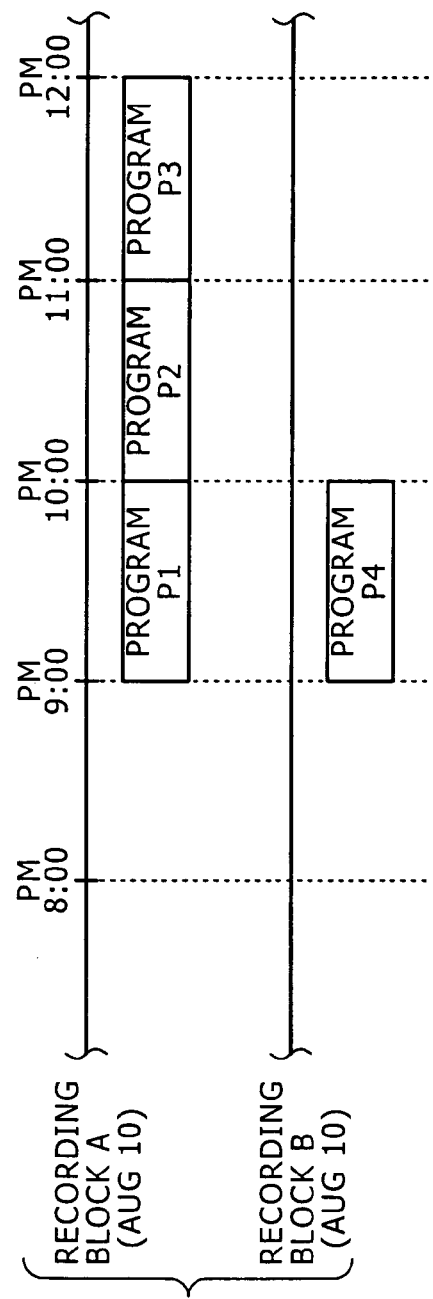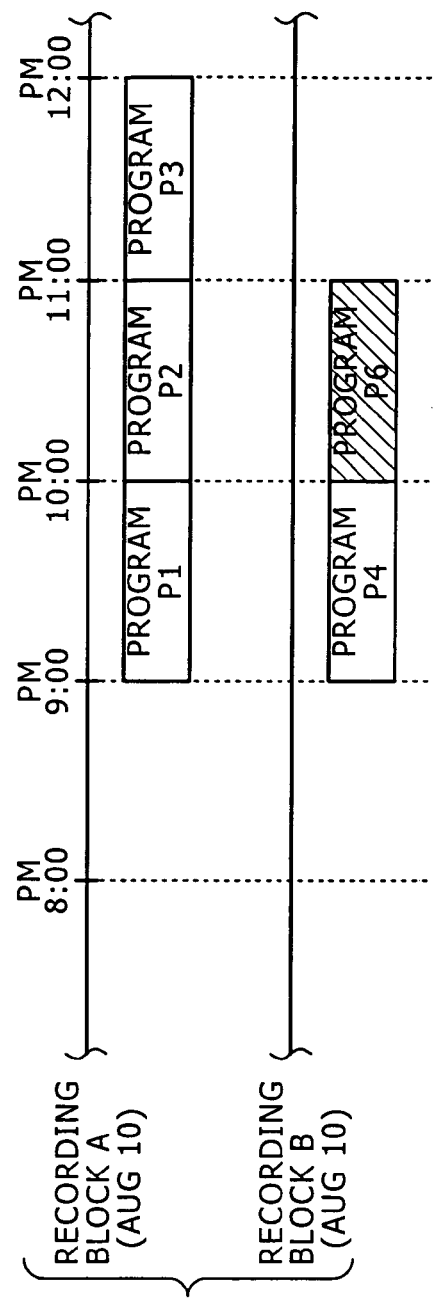

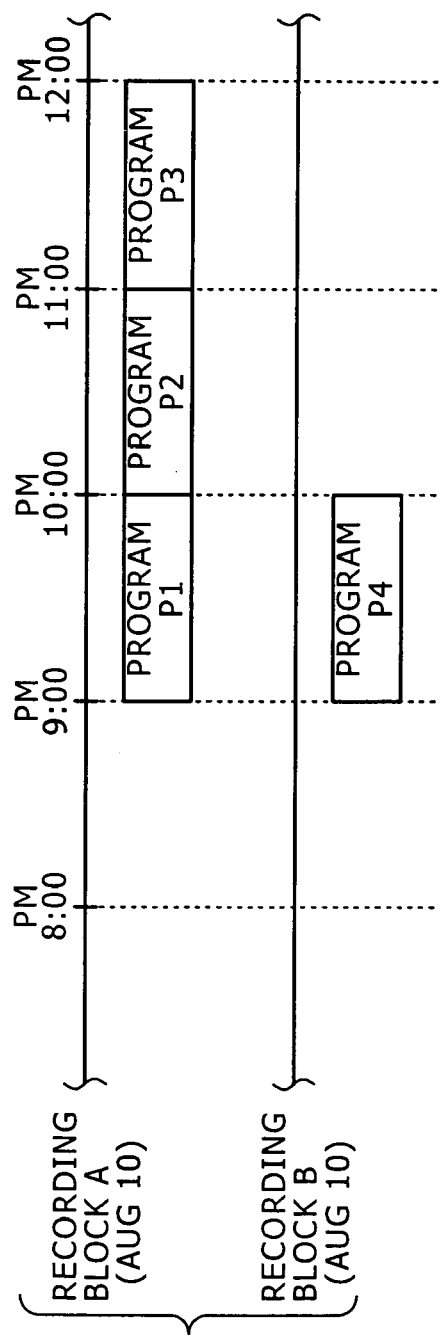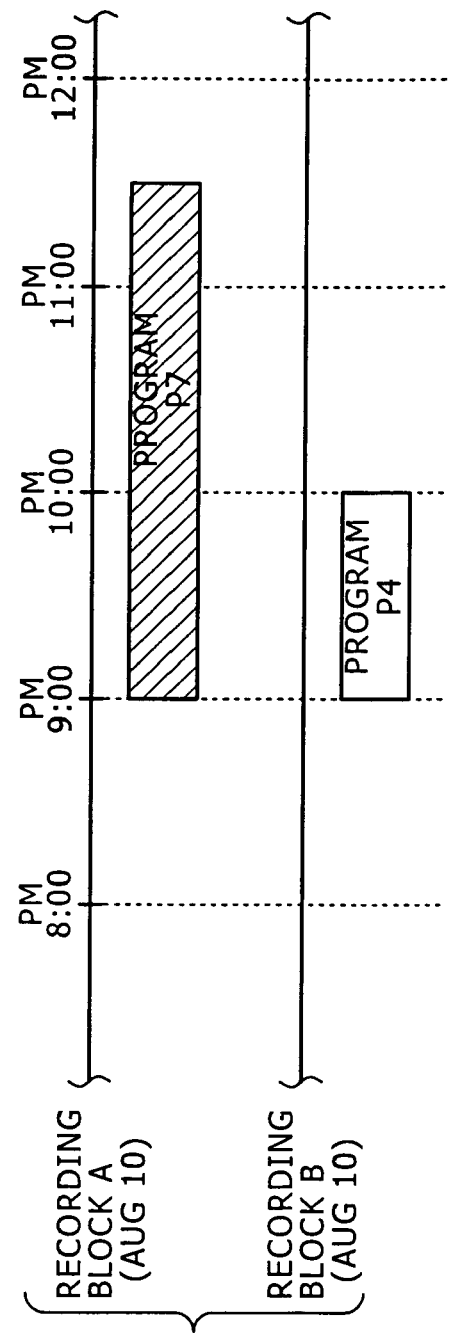

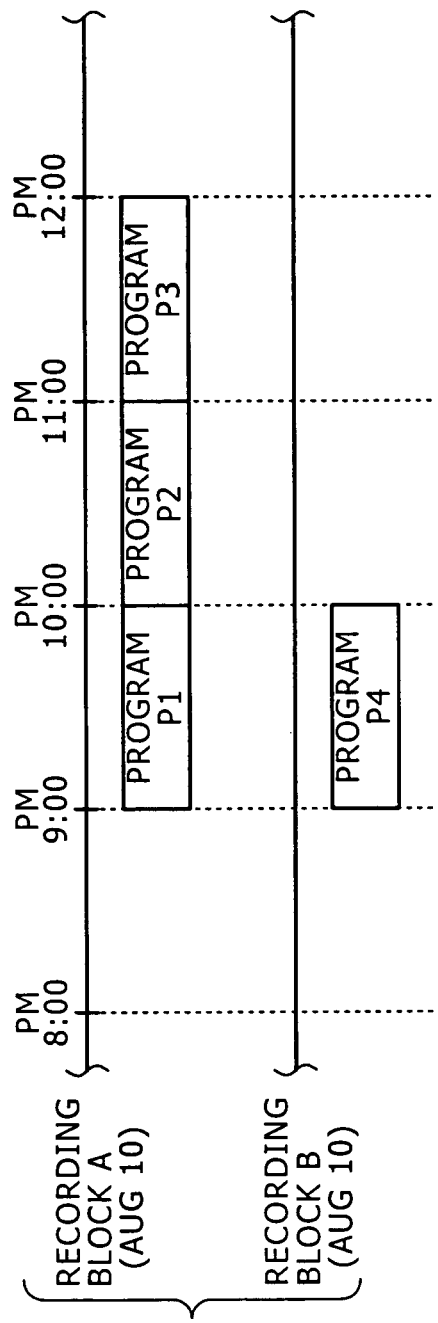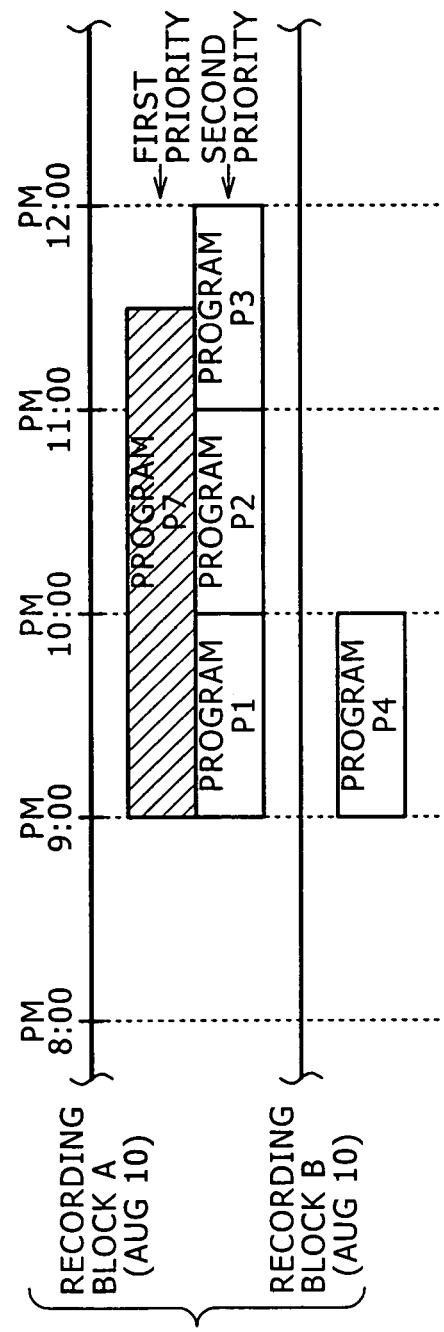

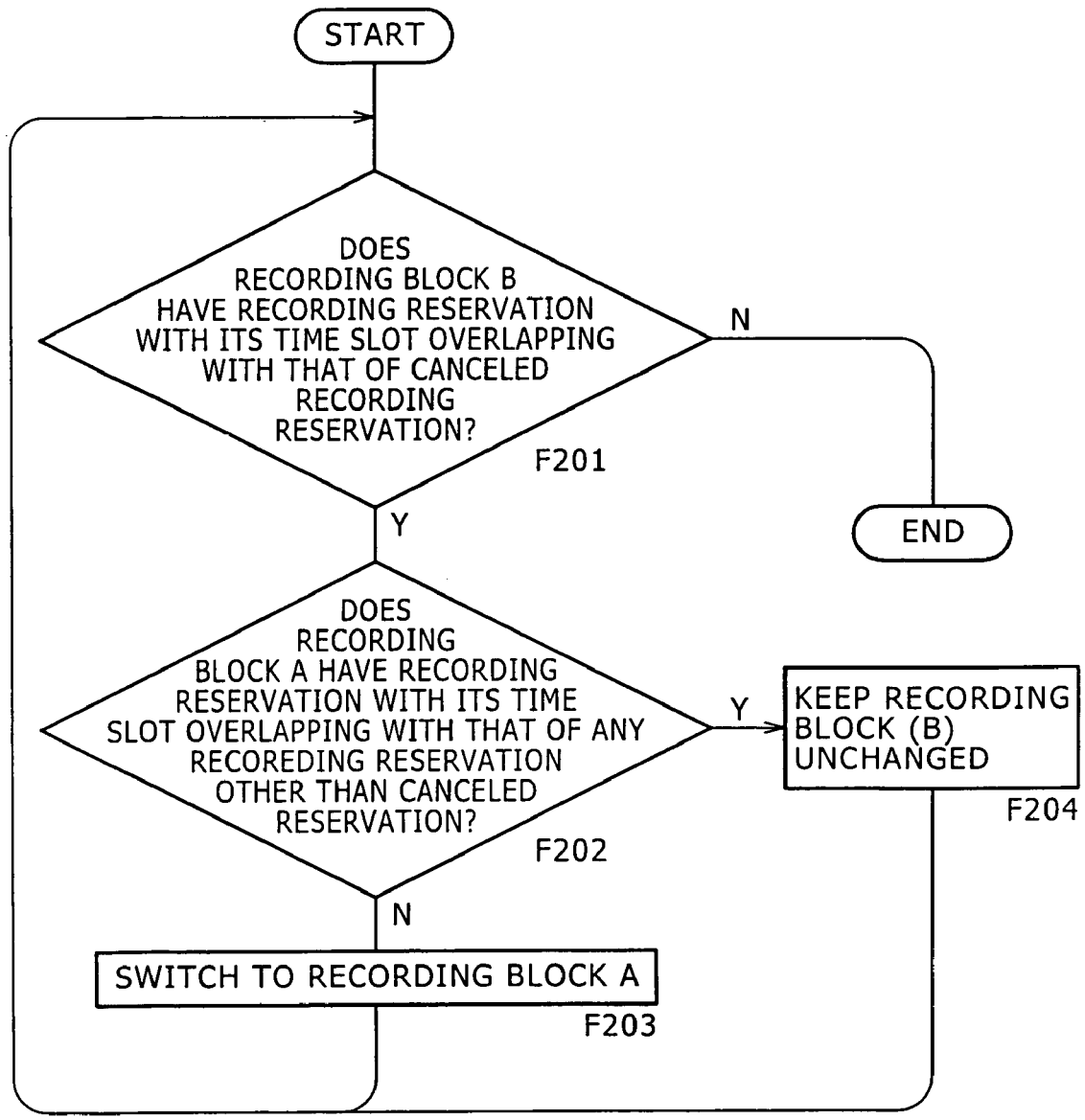

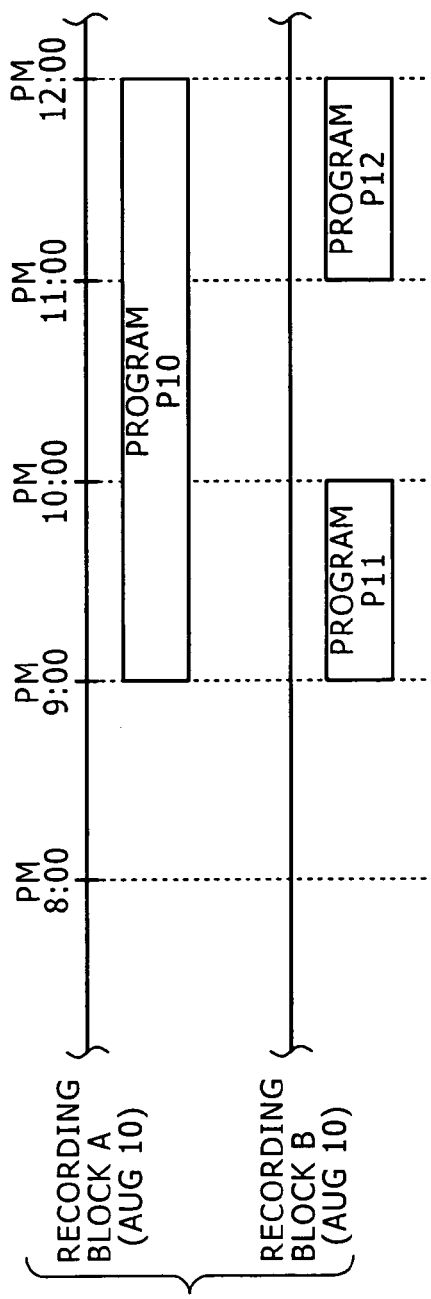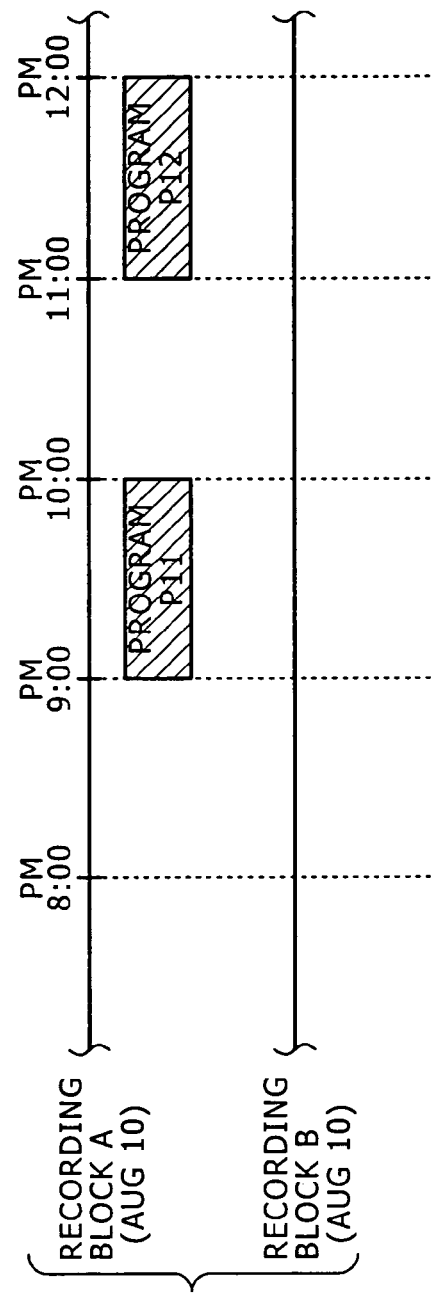

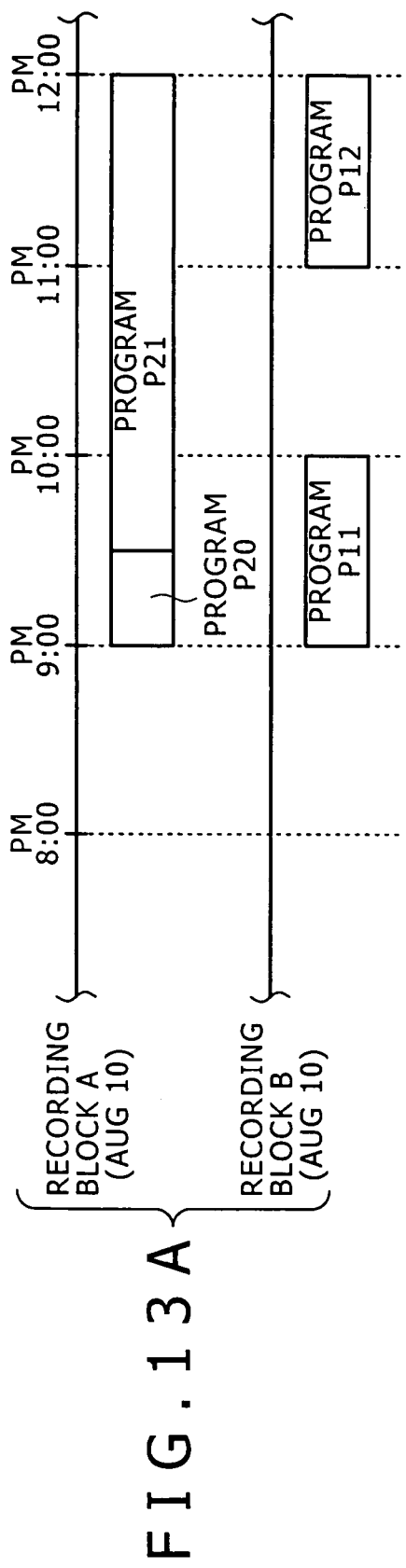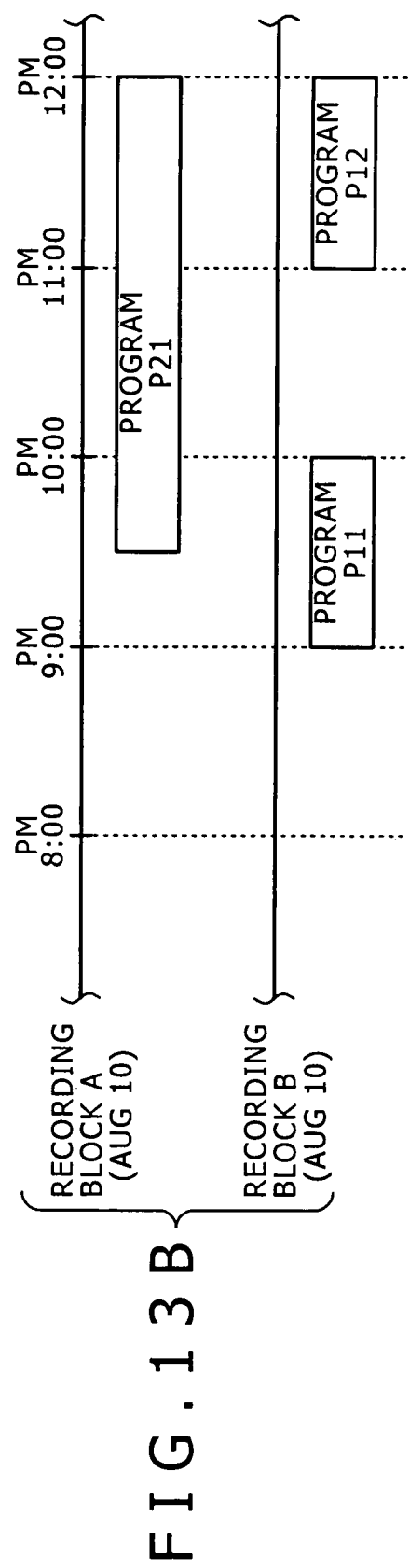

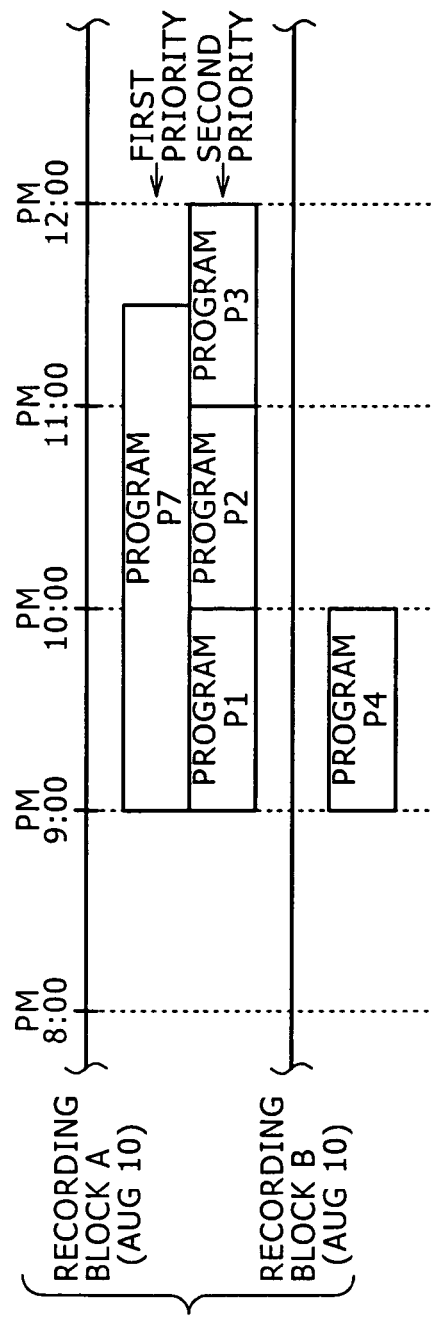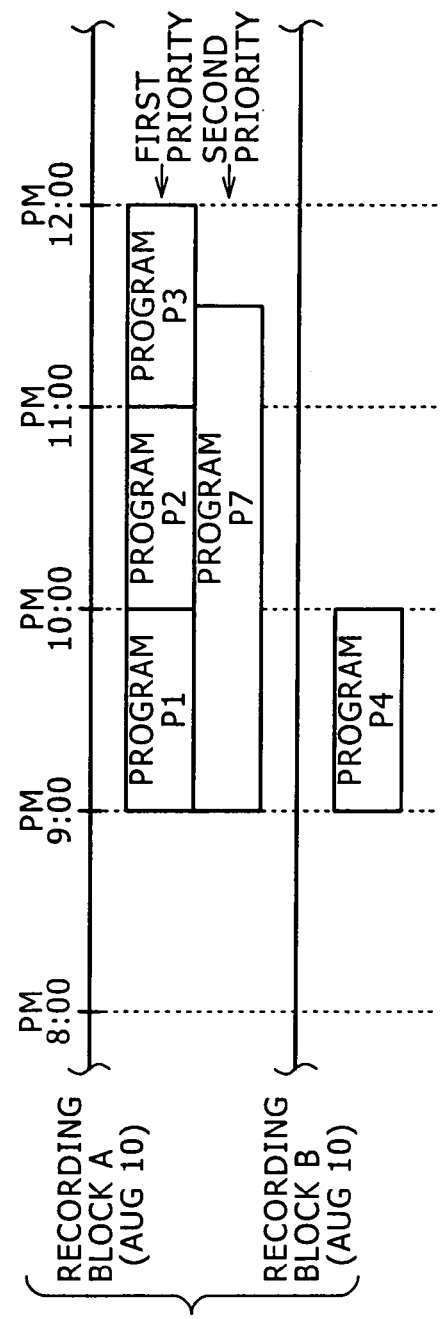

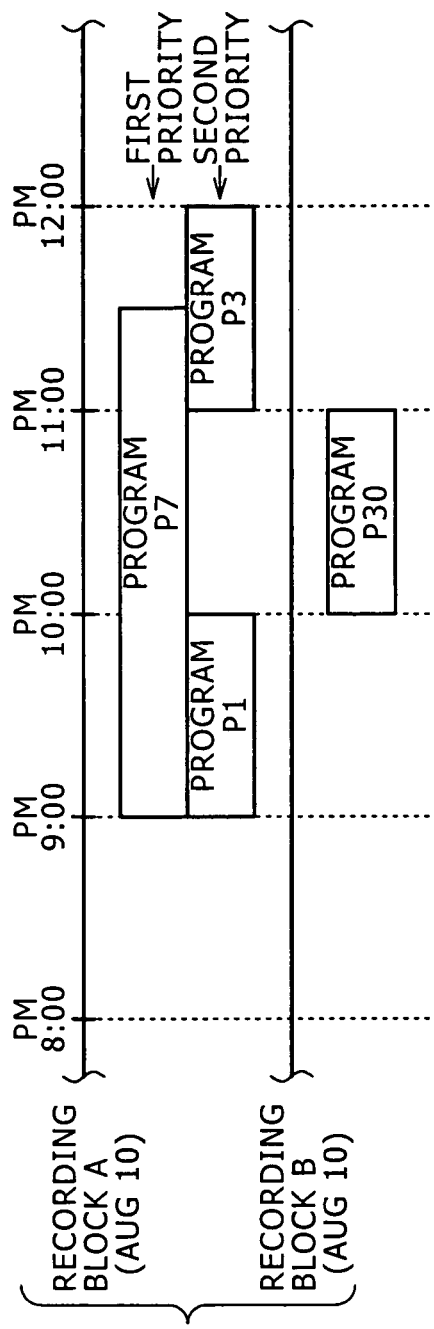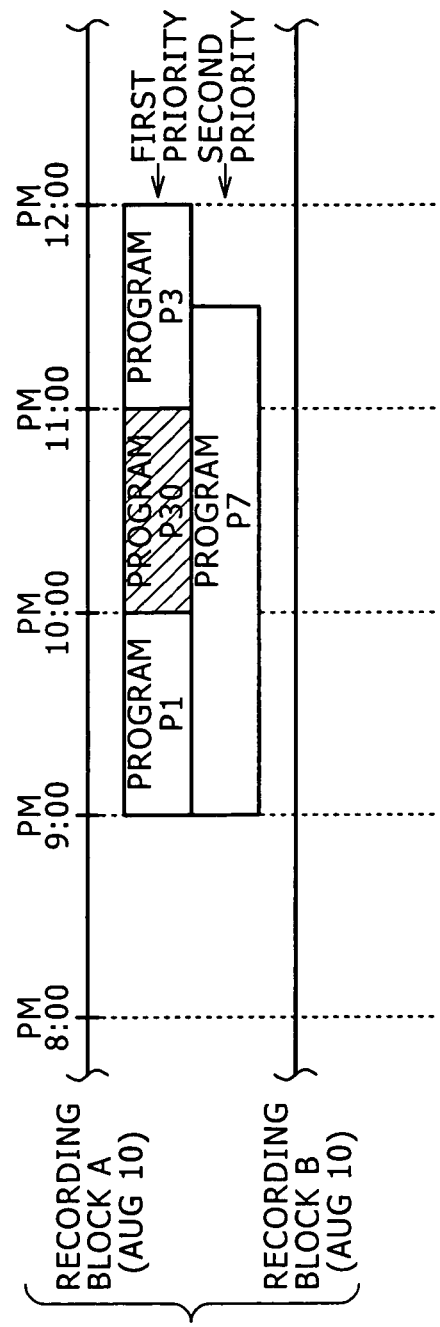

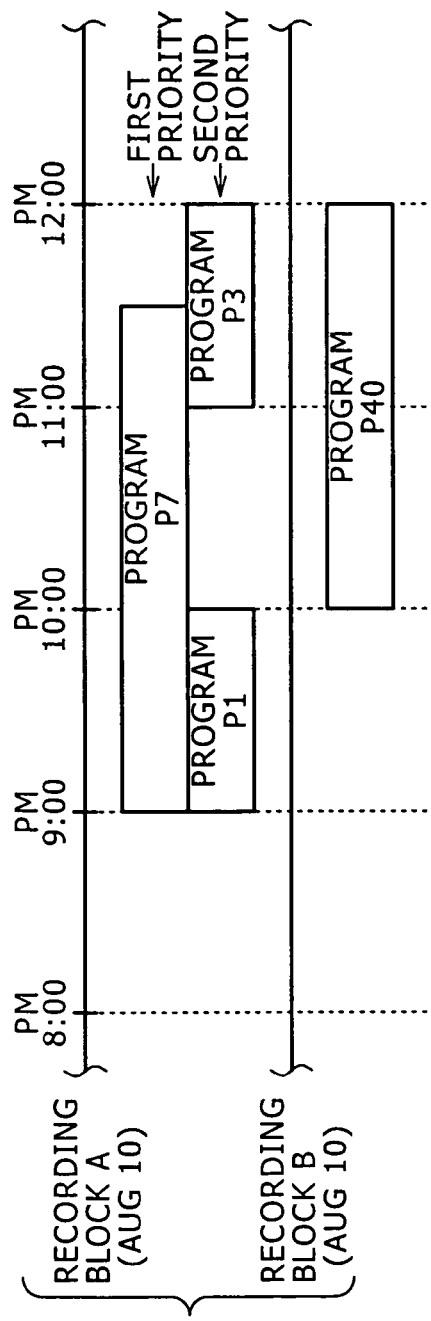
F I G. 1 7 A
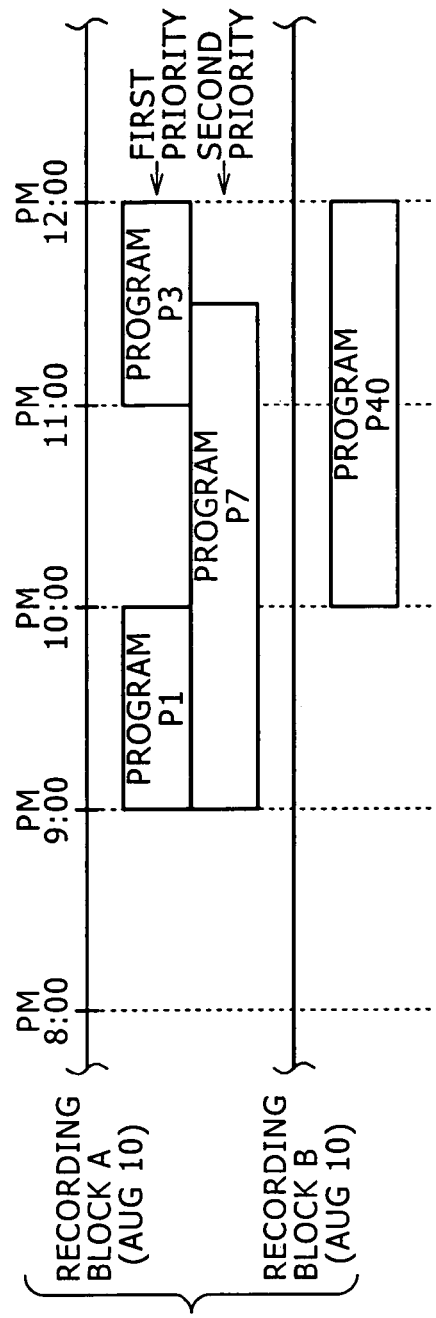
F I G. 1 7 B

RECORDING APPARATUS AND RECORDING RESERVATION PROCESSING METHOD

TECHNICAL FIELD

The present invention relates to a recording apparatus and a recording reservation managing method. The recording apparatus has plurality of recording means for recording broadcast contents.

BACKGROUND ART

Recent years have witnessed the development of diverse recording apparatuses for recording broadcast contents (TV programs, etc.). The apparatuses include video recorders utilizing recording media such as HDDs (Hard Disk Drives) and DVDs (Digital Versatile Disks).

A number of techniques such as those disclosed in Japanese Patent Laid-open Nos. 2002-152639 and Hei 10-341381 have been proposed for use with the apparatuses. These techniques constitute processes intended to improve the operability of the apparatuses and enhance their users' convenience.

Some of these apparatuses for receiving and recording broadcast contents contain illustratively a plurality of TV broadcast tuners each so that two or more TV programs may be recorded simultaneously.

For example, an apparatus using a HDD as its recording medium and including two circuit blocks with tuner and encoding capabilities each for recording can record a plurality of broadcast contents simultaneously using the single HDD on a time division basis. The same feature can be implemented by apparatuses each including a plurality of HDDs or having both a HDD and a DVD drive.

In other words, a plurality of broadcast contents can be recorded by diverse setups made up of varying types and numbers of recording media. Provided two conditions are met: that a plurality of broadcast contents be received simultaneously, and that the signals of the received broadcast contents be encoded simultaneously for recording purposes.

Conventional recording apparatuses equipped with a plurality of tuners each generally use one of the tuners to receive a broadcast content for real-time live viewing, and other tuners for receiving other broadcast contents to be recorded. In this case, a plurality of broadcast contents are not assumed to be recorded simultaneously.

Other conventional recorders capable of recording contents on a plurality of recording media such as a VHS tape and an 8-mm video tape incorporate encoding circuits corresponding to the respective recording media. When making (or reserving) a recording, the user of such a recorder specifies which of the recording media is to be used for the recording. In other words, the user selects one of a plurality of recording function blocks when designating a desired recording medium.

That is not the case with the apparatus which uses a single HDD as its recording medium and which records a plurality of broadcast contents on the medium simultaneously as mentioned above.

If a recorder has multiple sets of tuners and encoding circuits for recording (these sets of components are referred as the recording facilities or recording blocks hereunder), that recorder can record a plurality of broadcast contents simultaneously as described. Where a single HDD is used, the user remains unaware of the recording medium being utilized for recording. There are other circumstances in which the user is unaware of any recording medium for use in recording, such as where each of the recording facilities incorporated corresponds to a plurality of recording media (e.g., multiple-HDD setups).

When the user is not aware of the selection of recording media, it means the user is unaware of how may recording blocks are incorporated or what kinds of facilities these blocks are.

Where a recording apparatus incorporates a plurality of recording blocks capable of making recording reservations, it is conceivable that the tuner contained in one of the recording blocks is used for real-time viewing.

Being capable of recording contents simultaneously signifies that different contents broadcast in the same time slot can be reserved for unattended recording. From the viewpoint of managing recording reservation information, that makes it necessary to reserve recordings with each of the recording blocks furnished.

When a tuner in one of the recording blocks is used for real-time viewing, it is preferred that any reservation for unattended recording be made with another of the recording blocks, i.e., not with the one containing the tuner for the real-time viewing application.

It follows that the user, whenever making a recording reservation, must select a particular recording block with which to make the reservation.

However, asking the user to select any of the recording blocks for recording reservation can be confusing. The user can become unsure of what to do or how to proceed or may be constrained to spend an inordinately long time doing what needs to be done.

Furthermore, asking the user to avoid using the recording block assigned for real-time viewing as much as possible when reserving a recording can also be baffling. The user may well be mystified about the purportedly different recording blocks that the user is not aware of in the first place.

DISCLOSURE OF INVENTION

The present invention has been made in view of the above circumstances and provides a recording apparatus such as a video recorder having a plurality of recording blocks (recording means), the apparatus being arranged to improve the user's ease of use in making recording reservations properly in a suitably managed reservation setup.

In carrying out the invention and according to a first aspect thereof, a recording apparatus includes: first through n-th recording means for recording input broadcast contents to a recording medium; user interfacing means for inputting an instruction of a user to reserve a recording of a broadcast content; and reservation managing means which manages reservations of broadcast content recordings with respect to each of the first through n-th recording means and which, when making a reservation of a broadcast content recording in accordance with the recording reservation instruction input through the user interfacing means, selects automatically one of the first through n-th recording means available for a time slot corresponding to the recording reservation, in order to make the recording reservation to the selected recording means.

In one preferred structure according to the invention, if the reservation managing means cannot automatically select any one of the first through n-th recording means because none of the recording means is available for the time slot corresponding to the recording reservation to be made in accordance with the recording reservation instruction input through the user interfacing means, then the user interfacing means may perform a selection requesting process for prompting the user to select one of the recording means to which to make the recording reservation. Preferably, if the user selects one of the recording means to which the recording reservation is to be made in response to the selection requesting process performed by the user interfacing means, then the reservation managing means may make the recording reservation to the user-selected recording means.

In another preferred structure according to the invention, when performing the selection requesting process, the user interfacing means may also carry out a process for presenting the time slot applicable to the broadcast content to be reserved for unattended recording, and any previously made recording reservation overlapping either partially or totally with the time slot.

In a further preferred structure according to the invention, the reservation managing means may perform a switching process for automatically switching a recording reservation made to any one of the recording means to another recording means.

In an even further preferred structure according to the invention, if a recording reservation made to a particular one of the first through n-th recording means is canceled, then the reservation managing means may switch another recording reservation made to another recording means to that particular recording means.

According to a second aspect of the invention, a recording reservation processing method for use with a recording apparatus has first through n-th recording means for recording input broadcast contents to a recording medium. The recording reservation processing method includes the steps of: inputting an instruction to reserve a broadcast content recording based on operations by a user; automatically selecting from the first through n-th recording means recording means available for a time slot corresponding to the recording reservation designated by the instruction input in the inputting step; and making the recording reservation to the recording means selected automatically in the automatically selecting step, the recording reservation being designated by the instruction input in the inputting step.

In one preferred variation according to the invention, the recording reservation processing method may further include the steps of: if the automatically selecting step fails to select from the first through n-th recording means any recording means available for the time slot corresponding to the recording reservation designated by the instruction input in the inputting step, then requesting the user to select recording means to which the recording reservation is to be made; and if the user selects in the selection requesting step the recording means to which to make the recording reservation, then making the recording reservation a second time to the user-selected recording means.

In another variation according to the invention, the selection requesting step may further include carrying out a process for presenting the time slot applicable to the broadcast content to be reserved for unattended recording, and any previously made recording reservation overlapping either partially or totally with the time slot.

According to a third aspect of the invention, a recording reservation processing method for use with a recording apparatus has first through n-th recording means for recording input broadcast contents to a recording medium. The recording reservation processing method includes the steps of: making a reservation of a broadcast content recording to any one of the first through n-th recording means; and switching automatically a recording reservation made to any one of the recording means to another recording means.

Preferably, if a recording reservation made to a particular one of the first through n-th recording means is canceled, then the switching step may switch automatically another recording reservation made to another recording means to that particular recording means.

According to this invention, one of a plurality of recording means is automatically selected so that a recording reservation designated by the user may be made to the selected recording means. If any of the recording means cannot be selected automatically, i.e., if recording reservations have already been made to all recording means for a time slot corresponding to the reservation desired to be made anew, the user is asked to select particular recording means for the reservation. Specifically, the user is requested either to cancel a recording reservation previously made to one of the recording means to make room for the new recording reservation, or to renounce the recording reservation this time. The user's involvement is solicited only if the user's will is required to be manifest in the selection to be performed.

Also according to the invention, a recording reservation previously made to one of the recording means may be switched automatically to another recording means as needed.

That is, any recording reservation after being made may be switched from one recording means to another before actual execution of the recording, in order to reflect the status of other recording reservations that have been made since.

More particularly, if a recording reservation made to a particular one of the first through n-th recording means is canceled, then another recording reservation made to another recording means may be switched automatically to that particular recording means. The inventive arrangements above help to concentrate recording reservations on specific recording means as much as possible while minimizing the reservations dispersed to the other recording means.

BRIEF DESCRIPTION OF DRAWINGS

FIG. 4 is an explanatory view of a recording reservation setting screen displayed by the embodiment;

FIG. 5 is an explanatory view of an overlapping reservation verification and selection screen displayed by the embodiment;

FIG. 6 is a flowchart of steps constituting a recording block selecting process performed by the embodiment;

FIGS. 7A and 7B are explanatory views showing an example of how a recording reservation is made by the embodiment as it selects a recording block automatically;

FIGS. 8A and 8B are explanatory views showing another example of how a recording reservation is made by the embodiment as it selects a recording block automatically;

FIGS. 9A and 9B are explanatory views showing an example of how a recording reservation is made by the embodiment as it prompts a user to make choices;

FIGS. 10A and 10B are explanatory views showing another example of how a recording reservation is made by the embodiment as it prompts the user to make choices;

FIG. 11 is a flowchart of steps constituting a recording block switching process performed by the embodiment when a recording reservation is canceled;

FIGS. 12A and 12B are explanatory views showing an example of how recording blocks are switched by the embodiment when a recording reservation is canceled;

FIGS. 13A and 13B are explanatory views showing an example of how recording blocks are not switched by the embodiment when a recording reservation is canceled;

FIGS. 15A and 15B are explanatory views showing an example of how priorities are switched by the embodiment when a recording reservation is canceled;

FIGS. 16A and 16B are explanatory views showing an example of how priorities and recording blocks are switched by the embodiment when a recording reservation is canceled; and FIGS. 17A and 17B are explanatory views showing an example of how priorities are switched by the embodiment with the recording blocks remaining unchanged when a recording reservation is canceled.

BEST MODE FOR CARRYING OUT THE INVENTION

Figure 1:
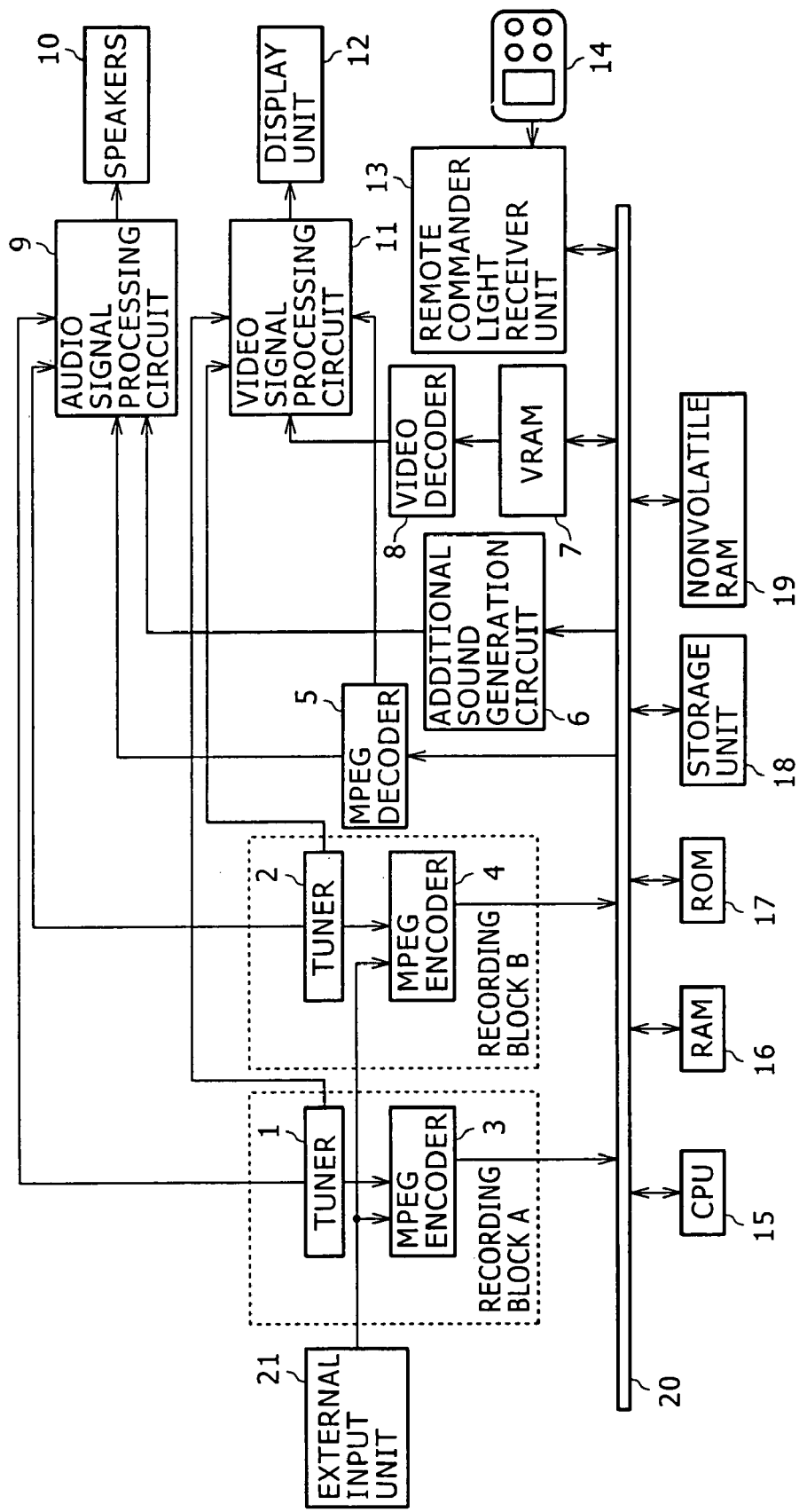
FIG. 1 is a block diagram showing a hardware structure of a recording apparatus embodying the invention.

A recording apparatus (digital video recorder) capable of digitally recording analog TV programs will now be described as a preferred embodiment of this invention. The ensuing description will be made under the following headings:

1. Hardware structure of the recording apparatus
2. Software structure of the recording apparatus
3. Example of how a recording reservation is made
4. First example of how recording reservations are switched between recording blocks
5. Second example of how recording reservations are switched between recording blocks
6. Variations 1. Hardware Structure of the Recording Apparatus FIG. 1 is a block diagram showing a hardware structure of a recording apparatus (digital video recorder) which embodies the invention and which is capable of receiving analog TV broadcasts and digitally recording the received broadcasts.

Tuners 1 and 2 are each compatible with analog TV broadcasts. Although the tuners are explained below as analog TV broadcast-compliant devices, they may alternatively be designed to capture terrestrial or satellite digital broadcasts.

Under control of a CPU 15, the tuners 1 and 2 extract from a plurality of TV programs (broadcast contents) received by an antenna, not shown, the signals of the programs desired by the user. The extracted signals are sent from the tuners 1 and 2 to MPEG (Moving Picture Experts Group) encoders 3 and 4 respectively.

When a TV program is normally received for real-time viewing, the tuner 1 or 2 is arranged to forward the audio and video signals of the received program to an audio signal processing circuit 9 and a video signal processing circuit 11 respectively.

The MPEG encoders 3 and 4 acquire TV program signals from the tuners 1 and 2 respectively or a video signal input from an external device through an external input unit 21. The acquired signals are encoded by the MPEG encoders 3 and 4 illustratively for compression in MPEG format in order to make recordings of the programs.

The encoded (e.g., compressed) data is fed to a storage unit 18 via a bus 20 and stored therein. For example, one TV program is stored as one video content.

From the storage unit 18, an MPEG decoder 5 reads a data stream of a video content compressed in MPEG format via the bus 20 and decodes the retrieved data stream. Audio and video signals derived from the decoding are output to the audio signal processing circuit 9 and video signal processing circuit 11 respectively.

An additional sound generation circuit 6 generates operating and additional sounds representative of operations made by the user on a remote commander 14. The generated sounds are output to the audio signal processing circuit 9.

A video decoder 8 reads display-ready image data from a VRAM (video RAM) 7 and converts the retrieved data into a video signal. The video signal derived from the conversion is supplied to the video signal processing circuit 11.

The audio signal processing circuit 9 subjects audio data coming from the tuner 1 or 2 or from the MPEG decoder 5 to D/A (Digital to Analog) conversion, and amplifies or otherwise processes the converted data. The audio data thus processed is output to speakers 10 connected to the apparatus. If additional sounds are being supplied by the additional sound generation circuit 6, the audio signal processing circuit 9 first submits the audio data from the tuner 1 or 2 or from the MPEG decoder 5 to D/A conversion and then combines the converted audio signal with the additional sounds for output to the speakers 10.

The video signal processing circuit 11 subjects the video data coming from the tuner 1 or 2 or from the MPEG decoder 5 to D/A conversion and outputs the converted data to a display unit 12 connected to the apparatus. If display-ready image data is being supplied from the video decoder 8, the video signal processing circuit 11 first combines the video data from the tuner 1 or 2 or from the MPEG decoder 5 with the supplied image data, submits the combined data to D/A conversion, and then outputs to the display unit 12.

The speakers 10 output the audio signal fed by the audio signal processing circuit 9. The display unit 12 displays (i.e., reproduces) the video signal supplied by the video signal processing circuit 11.

The speakers 10 and display unit 12 may be furnished as integral parts of this recording apparatus or may be connected to the apparatus as separate devices.

A remote commander light receiver unit 13 receives an operation signal in the form of light emissions from the remote commander 14 which illustratively outputs infrared rays when operated by the user. The light-borne operation signal received by the remote commander light receiver unit 13 is converted into an electrical operation command signal for output to the CPU 15. Needless to say, the remote commander 14 may emit radio wave signals instead of infrared ray signals.

The remote commander 14 and remote commander light receiver unit 13 constitute a block with which the user performs various operations. For example, the user performs operations using the remote commander 14 when making a recording reservation, as will be described later.

When operations are made on the remote commander 14, the display unit 12 displays menu screens in GUI form. The VRAM 7 and video decoder 8 mentioned above generates video signals for such GUI displays.

In addition to the remote commander 14, an operation panel may be formed on the enclosure of the recording apparatus. Either the remote commander 14 or the operation panel may be used to input various operations.

The CPU (Central Processing Unit) 15 admits operation signals (i.e., commands) from the remote commander light receiver unit 13. In turn, the CPU 15 executes diverse processes in keeping with programs held in a ROM (Read Only Memory) 17 or in the storage unit 18.

A RAM 16 temporarily accommodates a boot module, a platform software program (e.g., OS), and application programs which have been loaded from the ROM 17 or storage unit 18, or varying parameters being used during the ongoing process.

The ROM 17 holds platform software modules for operating the CPU 15, as well as the boot module.

A nonvolatile RAM 19 is formed illustratively by a memory card or a flash memory that stores the user's identification information, accounting information, and preference information.

The storage unit 18 is made up illustratively of a magnetic hard disk drive or a recordable DVD drive that accommodates video contents, data about video contents (i.e., meta data), and EPG information.

The storage unit 18 further stores the data encoded by the MPEG encoders 3 and 4 as described above. That is, the storage unit 18 serves as the destination to which the broadcast contents received by this recording apparatus are recorded.

The inventive recording apparatus (digital video recorder) can receive two terrestrial TV programs simultaneously using the tuners 1 and 2, encode the received programs simultaneously using the MPEG encoders 3 and 4, and record the encoded program data to the storage unit 18.

In the description that follows, it is assumed that the tuner 1 and MPEG encoder 3 constitute a recording block A and that the tuner 2 and MPEG encoder 4 make up a recording block B.

It is also assumed that ordinary real-time viewing is made by use of the tuner 2. That means live viewing is made using the recording block B.

2. Software Structure of the Recording Apparatus

Figure 2:
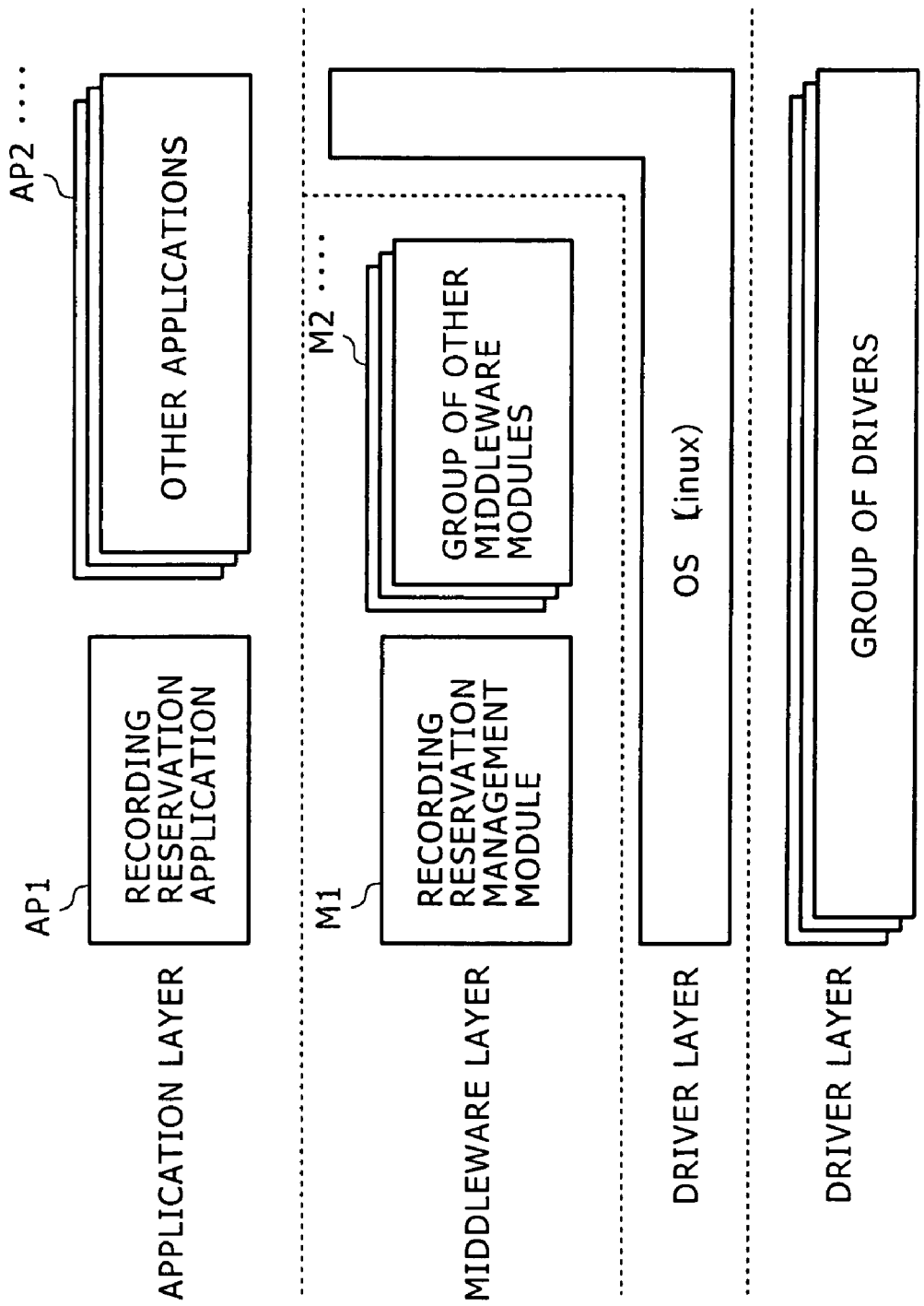
FIG. 2 is a block diagram indicating a software structure of the recording apparatus practiced as the embodiment of the invention.

FIG. 2 indicates a software structure of the digital video recorder according to the invention.

The software of this apparatus is made up of four layers: drive layer, OS layer, middleware layer, and application layer. The apparatus adopts Linux as its operating system. Each software module being executed constitutes a single Linux process.

The driver layer is formed by a group of software modules designed to control hardware.

The middleware layer is composed of a group of platform software modules (M1, M2, . . . ) operating on the OS. These modules are designed to provide software modules in the application layer with more sophisticated and more concrete functions than those of the OS or drivers or with facilities necessary for a plurality of applications to work in collaboration.

A recording reservation management module M1 for managing recording reservations on the digital video recorder is one of the modules in the middleware layer.

The recording reservation management module M1 manages recording reservations that have been made, and allows new recording reservations to be made in response to recording reservation requests input by the user's operations. The recording reservations are managed separately with respect to each of the recording blocks A and B. More specifically, the recording reservations made to the recording block A are managed independently of those made and managed with respect to the recording block B.

The application layer is constituted by software modules AP1, AP2, etc. These modules implement services to be furnished by the digital video recorder using the functions provided by the software modules in the OS layer or middleware layer below the application layer. The recording reservation application AP1 taking care of recording reservations on this digital video recorder is one of the modules in the application layer. The application AP1 provides a user interface that allows the user to make recording reservations by designating times, broadcast station names, and channel numbers.

The software structure outlined above is implemented by the CPU 15 executing suitable programs and through the use of storage spaces in the RAM 16, ROM 17, storage unit 18, and nonvolatile RAM 19.

The information made up of the recording reservations managed by the recording reservation management module M1 is stored illustratively in the nonvolatile RAM 19 or storage unit 18.

3. Example of how a Recording Reservation is Made

Figure 3:
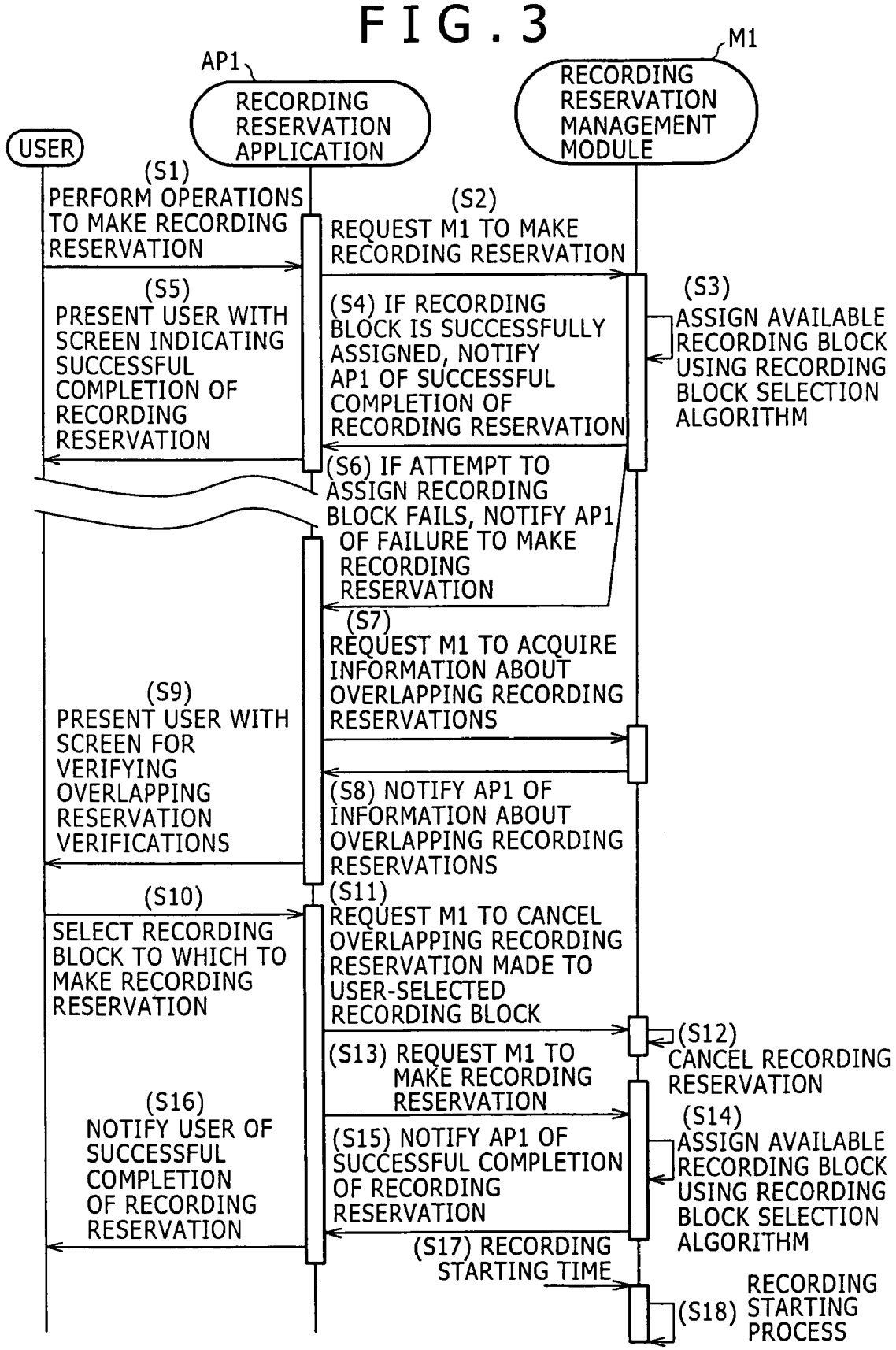
FIG. 3 is an explanatory view of steps constituting a recording reservation making process performed by the embodiment of this invention.

FIG. 3 shows steps constituting a recording reservation making process carried out by the digital video recorder of this invention when the user performs operations to make a recording reservation. As indicated, the process takes place as a sequence of collaborative operations between the user and software components.

FIG. 3 outlines three categories of steps: steps of operations input by the user, steps carried out by the recording reservation application AP1, and steps executed by the recording reservation management module M1.

The steps are shown ranging from S1 to S18.

Step S1 involves the user inputting operation-based information to specify that a recording reservation is to be made.

For such operation input to take place, the recording reservation application AP1 causes the display unit 12 to display the screen indicated in FIG. 4. On this screen, the user is prompted to enter a recording starting time, a recording ending time, a broadcast station name, and a channel number. After making the entries, the user operates the (OK) button to finalize the selection. This sends the result of the recording reservation operation input in step S1 of FIG. 3 to the recording reservation application AP1.

In response to the operation input, the recording reservation application AP1 requests the recording reservation management module M1 to make a recording reservation (in step S2).

Given the recording reservation request, the recording reservation management module M1 automatically selects an available recording block using a recording block selection algorithm to make the requested recording reservation (in step S3).

FIG. 6 is a flowchart of steps constituting a recording block selecting process performed by the recording reservation management module M1.

In step F101, the recording reservation management module M1 checks the recording block A for its current status of recording reservations in order to verify whether there is any existing recording reservation with its time slot overlapping with that of the recording reservation requested this time.

If in step F101 the recording block A is found to have no existing recording reservation with its time slot overlapping with that of the requested recording reservation, step S102 is reached. In step S102, the recording block A is assigned to the requested recording reservation. In other words, the recording reservation specified by the user's operation is automatically made to the recording block A.

If in step F101 the recording block A is found to have any existing recording reservation with its time slot overlapping with that of the requested recording reservation, step F103 is reached. In step F103, the recording reservation management module M1 checks the recording block B for its current status of recording reservations in order to verify whether there is any existing recording reservation with its time slot overlapping with that of the requested recording reservation.

If in step F103 the recording block B is found to have no existing recording reservation with its time slot overlapping with that of the requested recording reservation, step S104 is reached. In step S104, the recording block B is assigned to the requested recording reservation. In other words, the recording reservation specified by the user's operation is automatically made to the recording block B.

If in step F103 the recording block B is found to have any existing recording reservation with its time slot overlapping with that of the requested recording reservation, step F105 is reached. In step F105, the recording reservation management module M1 concludes that there is no available recording block for the moment and proceeds to terminate the process without making the recording reservation.

In step S3 of FIG. 3, the process executed as described in FIG. 6 allows the recording reservation to be made automatically with respect to the recording block A or B. As can be seen in FIG. 6, any recording reservation is made preferentially to the recording block A. That is, if the recording block A has an existing recording reservation with its time slot overlapping with that of the requested recording reservation, then the requested recording reservation is made to the recording block B. That is because the tuner 2 of the recording block B is usually employed for live viewing as mentioned earlier.

If the recording reservation has been made by execution of step F102 or F104 of FIG. 6 while step S3 of FIG. 3 is being performed, the recording reservation management module M1 goes to step S4 of FIG. 3. In step S4, the recording reservation management module M1 notifies the recording reservation application AP1 that the recording reservation is successfully completed.

When notified of the successful completion of the recording reservation, the recording reservation application AP1 reaches step S5. In step S5, the recording reservation application AP1 causes the display unit 12 to present the user with a screen indicating the successful completion of the recording reservation. This completes the whole recording reservation processing initiated by the user's operation.

Suppose that in step F105 of FIG. 6, the recording blocks A and B are both found to have recording reservations with their time slots overlapping with that of the requested recording reservation, so that the recording blocks are both unavailable this time. In such a case, the recording reservation management module M1 goes to step S6 of FIG. 3. In step S6, the recording reservation management module M1 notifies the recording reservation application AP1 that the attempt to make the recording reservation has failed.

When notified of the failed attempt to make the recording reservation, the recording reservation application AP1 goes to step S7. In step S7, the recording reservation application AP1 requests the recording reservation management module M1 to acquire information about the overlapping recording reservations.

Given the request to acquire information, the recording reservation management module M1 extracts information about those recording reservations in the recoding blocks A and B which have the time slots overlapping with the time slot of the requested recording reservation. The extracted information is reported to the recording reservation application AP1 (in step S8).

On acquiring the information about any recording reservation with its time slot overlapping with that of the requested recording reservation, the recording reservation application AP1 goes to step S9. In step S9, the recording reservation application AP1 causes the display unit 12 to present the user with a screen carrying the information about the existing recording reservations made for each of the recording blocks for verification.

Illustratively, the screen of FIG. 5 is displayed. In this case, the existing recording reservations with the overlapping time slots in each of the recording blocks A and B are displayed. For example, suppose that the requested recording reservation corresponds to a time slot of 9:00 PM to 12:00 PM on August 10. Then the display unit 12 is arranged to display, for each of the recording blocks A and B, the existing recording reservations with their time slots overlapping partially or totally with the time slot of the requested recording reservation.

The screen prompts the user to give an instruction for what to do about the overlapping recording reservations.

More specifically, the user is asked to determine whether to renounce the recording reservation designated this time, to cancel an existing recording reservation in the recording block A to make room for the new recording reservation, or to cancel an existing recording reservation in the recording block B and replace it with the new recording reservation.

The user operates on the screen presented as shown in FIG. 5. When renouncing the new recording reservation, the user operates on the (BACK) key or performs a cancel operation, not shown. In that case, the entire recording reservation making process is terminated with a cancellation (not shown in FIG. 3).

It might happen that the user chooses to cancel an existing recoding reservation in the recording block A or B to make room for the new recording reservation (in step S10). In such a case, the recording reservation application AP1 goes to step S11 and requests the recording reservation management module M1 to cancel the overlapping recording reservation for the recording block selected by the user.

Illustratively on the screen of FIG. 5, the user might perform operations to cancel the overlapping reservations in the recording block A to make room for the new recording reservation. In that case, the recording reservation application AP1 requests the recording reservation management module M1 to cancel the recording reservations in the recording block A for three programs with their time slots overlapping with the time slot of the new recording reservation.

The request to cancel the reservations is carried out by the recording reservation management module M1 in step S12.

In step S13, the recording reservation application AP1 again requests the recording reservation management module M1 to make the new recording reservation. That is, the request is made in response to the input operation in step S1.

In step S14, the recording reservation management module M1 responds to the request by carrying out the process of FIG. 6, i.e., by selecting the recording block and making the recording reservation to the selected block. Since the overlapping recording reservations have been canceled from one of the recording blocks, the new recording reservation is made to the vacated recording block.

After the recording reservation management module M1 has completed the new recording reservation through the process of FIG. 6 in step S14, the module M1 goes to step S15. In step S15, the recording reservation management module M1 notifies the recording reservation application AP1 that the recording reservation is successfully completed.

When notified of the successful completion of the recording reservation, the recording reservation application AP1 goes to step S16 and causes the display unit 12 to present the user with a screen saying that the recording reservation is successfully completed.

This completes the whole recording reservation processing initiated by the user's operation.

Upon finding that the recording starting time of a recording reservation is reached (in step S17), the recording reservation management module M1 triggers execution of the recording reservation in question, i.e., causes the corresponding recording block to start recording the reserved TV program (in step S18). This is how the desired TV program is recorded unattended as per the recording reservation.

The way recording reservations made by performing the foregoing steps will now be explained in more concrete terms.

FIG. 7A shows a state in which the recording reservations of programs P1, P2, and P3 are made to the recording block A for time slots of 9:00 PM to 10:00 PM, 10:00 PM to 11:00 PM, and 11:00 PM to 12:00 PM respectively on August 10 after 8:00 PM, and in which the recording reservation of a program P4 is made to the recording block B for the time slot of 9:00 PM to 10:00 PM on the same day.

Suppose now that the user performs operations in step S1 of FIG. 3 to make the new recording reservation of a program P5 for a time slot of 8:00 PM to 9:00 PM.

In this case, neither of the recording blocks A and B has any overlapping recording reservation in the time slot of 8:00 PM to 9:00 PM. Thus the process of FIG. 6 is carried out in step S3, with the recording block A automatically selected in steps F101 and F102 for the new reservation. Consequently, the program P5 is reserved to the recording block A for unattended recording as shown in FIG. 7B.

FIG. 8A shows the same state of recording reservations as that of FIG. 7A.

Suppose now that the user performs operations in step S1 of FIG. 3 to make the new recording reservation of a program P6 for the time slot of 10:00 PM to 11:00 PM.

Whereas the recording block A has an existing recording reservation (program P2) with its time slot overlapping with that of the new recording reservation, the recording block B has no overlapping reservation in the same time slot. Thus the process of FIG. 6 is carried out in step S3, with the recording block B automatically selected in steps F101, F103, and F104 for the new reservation. Consequently, the program P6 is reserved to the recording block B for unattended recording as shown in FIG. 8B.

FIG. 9A also shows the same state of recording reservations as that of FIG. 7A.

Suppose that the user performs operations in step S1 of FIG. 3 to make the new recording reservation of a program P7 for a time slot of 9:00 PM to 11:30 PM.

The time slot of 9:00 PM to 11:30 PM for the program P7 overlaps with the time slots of the programs P1, P2, and P3 already reserved to the recording block A for unattended recording. The time slot of the program P7 also overlaps with that of the program P4 already reserved to the recording block B.

In such a case, steps S6, S7, S8, and S9 in FIG. 3 are carried out. The screen of FIG. 5 is displayed, prompting the user to make choices.

If the user decides to cancel the existing reservations of the programs in the recording block A to make room for the new recording reservation, then steps S10, S11, and S12 are carried out to cancel the recording reservations of the programs P1, P2, and P3 from the recording block A. Thereafter, steps S13 and S14 are performed so as to make the recording reservation of the program P7 to the recording block A for the time slot of 9:00 PM to 11:30 PM.

FIG. 9B indicates the resulting state of the recording reservations.

The above-described processing by the inventive digital video recorder allows the user to designate a recording reservation without becoming aware of the multiple recording blocks in the recorder, i.e., recording blocks A and B. The designated recording reservation is made automatically to one of the recording blocks which is found available given the current state of the recording reservations set for the recording blocks.

The user thus finds it easy to make recording reservations and does not feel confused about a plurality of recording blocks in the recorder. That is, the user can correctly utilize the digital video recorder without having a clear understanding of the multiple recording blocks incorporated.

If any existing recording reservation or reservations exist in the same time slot as that of a newly designated recording reservation, the user is asked to make choices to properly resolve the conflict. The user need only verify the programs being reserved and determine whether or not to cancel any program or programs.

In the foregoing example, some of the existing recording reservations were shown canceled in step S12 to make room for the new recording reservation.

Alternatively, the reserved programs may be prioritized for recording while their reservations are kept intact.

In the example of FIGS. 9A and 9B, the recording reservations of the programs P1, P2, and P3 are shown canceled at the stage of FIG. 9B to make room for the recording reservation of the program P7.

It might happen that the user later changes his or her mind and decides to renounce the recording reservation of the program P7 and keep the programs P1, P2, and P3 reserved for recording as initially intended. In that case, the user is required to repeat the operations to make the recording reservations of the programs P1, P2, and P3.

Alternatively, as shown in FIG. 10B, the recording reservations of the programs P1, P2, and P3 may be left intact when the new recording reservation of the program P7 is made; simply the three programs may be downgraded from their current priority to a lower priority under the management scheme of this invention.

When the recording reservations are not canceled but simply their priorities are changed, the user is offered more ease of operation. Specifically, when the recording starting time is reached in the state of FIG. 10B, the recording block A starts recording the program P7 that has the first priority. If the user changes his mind and cancels the recording reservation of the program P7 before the recording starting time is reached, then the recording reservations of the programs P1, P2, and P3 are upgraded from their second priority to the first priority. When the recording starting time is reached, the recording block A starts recording the programs P1, P2, and P3 because they have the highest priority.

In the case above, the user need not repeat the operations to make the recording reservations of the programs P1, P2, and P3 after canceling the recording reservation of the program P7.

If the recording reservation of the program P7 is canceled from the state of FIG. 10B, that reservation may be either deleted, or left undeleted but downgraded from its current priority to a lower priority.

4. First Example of how Recording Reservations are Switched Between Recording Blocks As mentioned above, the digital video recorder of this invention usually employs the recording block B for live viewing.

It follows that the recording block A should preferably be utilized as much as possible for executing recording reservations so as not to disturb the user's live viewing using the recording block B. For this reason, the recording block A is assigned preferentially for making recording reservations in the process of FIG. 6.

However, if the recording block A is not available at the time of making a recording reservation, the new recording reservation is automatically assigned to the recording block B. The automatic assignment of a recording reservation to the recording block B is avoided as much as possible by the arrangement of this first example whereby recording reservations are switched automatically from one recording block to anther even after they have been established.

What takes place is this: a recording reservation assigned to the recording block B because of the unavailability of the recording block A at the time of making the reservation is later arranged to be switched to the recording block A if the block A becomes available before the recording starting time of the reservation is reached.

More specifically, if any existing recording reservation having been made to the recording block A is canceled, then the recording reservation management module M1 carries out the process of FIG. 11.

The process is arranged to shift previously assigned recording reservations between the recording blocks.

The processing algorithm of FIG. 11 is invoked when a recording reservation assigned to the recording block A is canceled. When any recording reservation is thus canceled from the recording block A, step F201 is reached. In step F201, a check is made to determine whether there exists any recording reservation which has been assigned to the recording block B and whose time slot overlaps with that of the canceled recording reservation.

If no such recording reservation is found to exist in step F201 exists, the process of FIG. 11 is brought to an end.

If there exists an applicable recording reservation, then step F202 and subsequent steps are carried out with respect to that recording reservation.

In step F202, a check is made to determine whether the time slot of the applicable recording reservation (assigned to the recording block B) overlaps with that of any recording reservation assigned to the recording block A other than the canceled recording reservation. The check is needed because an attempt to switch any recording reservation assigned to the recording block B to the recording block A requires verifying that the entire time slot of the recording reservation in question is vacant in the recording block A.

If in step F202 any overlapping recording reservation is found to exist, then step F204 is reached and the recording block assignments remain unchanged. That is because the applicable recording reservation cannot be switched to the recording block A for lack of available time slots.

If no overlapping recording reservation is found in step F202, step F203 is reached and the recording block assignments are switched. That is, the recording reservation in question is switched from the recording block B to the recording block A.

Upon completion of step F203 or F204, step F201 is again reached. A check is then made to determine whether there is any other recording reservation which has been assigned to the recording block B and whose time slot overlaps with that of the canceled recording reservation in the recording block A.

If there exists any applicable recording reservation, then step F202 and subsequent steps are repeated. If no applicable recording reservation is found to exist, then the process of FIG. 11 is brought to an end.

The way of switching the recording reservation assignments in the foregoing steps will now be explained in more concrete terms.

FIG. 12A shows a state in which the recording reservation of a program P10 is made to the recording block A for a time slot of 9:00 PM to 12:00 PM on August 10 after 8:00 PM, and in which the recording reservations of programs P11 and P12 are made to the recording block B for time slots of 9:00 PM to 10:00 PM and 11:00 PM to 12:00 PM respectively on the same day.

Suppose that the recording reservation of the program P10 is canceled. In that case, the program P11 is found applicable to a switch in step F201 of FIG. 11. Now that the recording reservation of the program P10 has been canceled, the recording block A has no recording reservation with its time slot overlapping with that of the program P11. Thus the recording reservation of the program P11 is switched from the recording block B to the recording block A in step F203.

Thereafter, the program P12 is also found applicable to a switch in step F201. With the recording reservation of the program P10 canceled, the recording block A has no recording reservation with its time slot overlapping with that of the program P12. Thus the recording reservation of the program P12 is also switched to the recording block A in step F203.

As a result, the state of recording reservations shown in FIG. 12A is replaced by the state indicated in FIG. 12B. In the state of FIG. 12B, the recording block B has no reserved time slot.

FIG. 13A shows a state in which the recording reservations of programs P20 and P21 are made to the recording block A for time slots of 9:00 PM to 9:30 PM and 9:30 PM to 12:00 PM respectively on August 10 after 8:00 PM, and in which the recording reservations of program P11 and P12 are made to the recording block B for time slots of 9:00 PM to 10:00 PM and 11:00 PM to 12:00 PM on the same day.

Suppose now that the recording reservation of the program P20 is canceled. In that case, the program P11 is found applicable to a switch in step F201 of FIG. 11.

However, the recording reservation of the one-hour program P11 has the second half of its time slot overlapping with that of the existing program P21. Thus step F202 in FIG. 11 is followed by step F204, so that the reservation assignment of the program P11 will not be switched to the recording block A.

As a result, the state of recording reservations shown in FIG. 13A is replaced by the state indicated in FIG. 13B. In the state of FIG. 13B, only the recording reservation of the program P20 is canceled and no recording reservation is switched from the recording block B to the recording block A.

As described, if a recording reservation assigned to the recording block A is canceled, any recording reservation which has been assigned to the recording block B and whose time slot is applicable to that of the canceled reservation may be switched to the recording block A as much as possible. This arrangement is intended to keep the recording block B free of recording reservations because this block should preferably be made available whenever possible for the usual live viewing.

5. Second Example of how Recording Reservations are Switched Between Recording Blocks As explained above with reference to FIGS. 10A and 10B, there is an alternative arrangement whereby a recording reservation, when canceled, is downgraded from its current priority to a lower priority but left undeleted.

Figure 14:
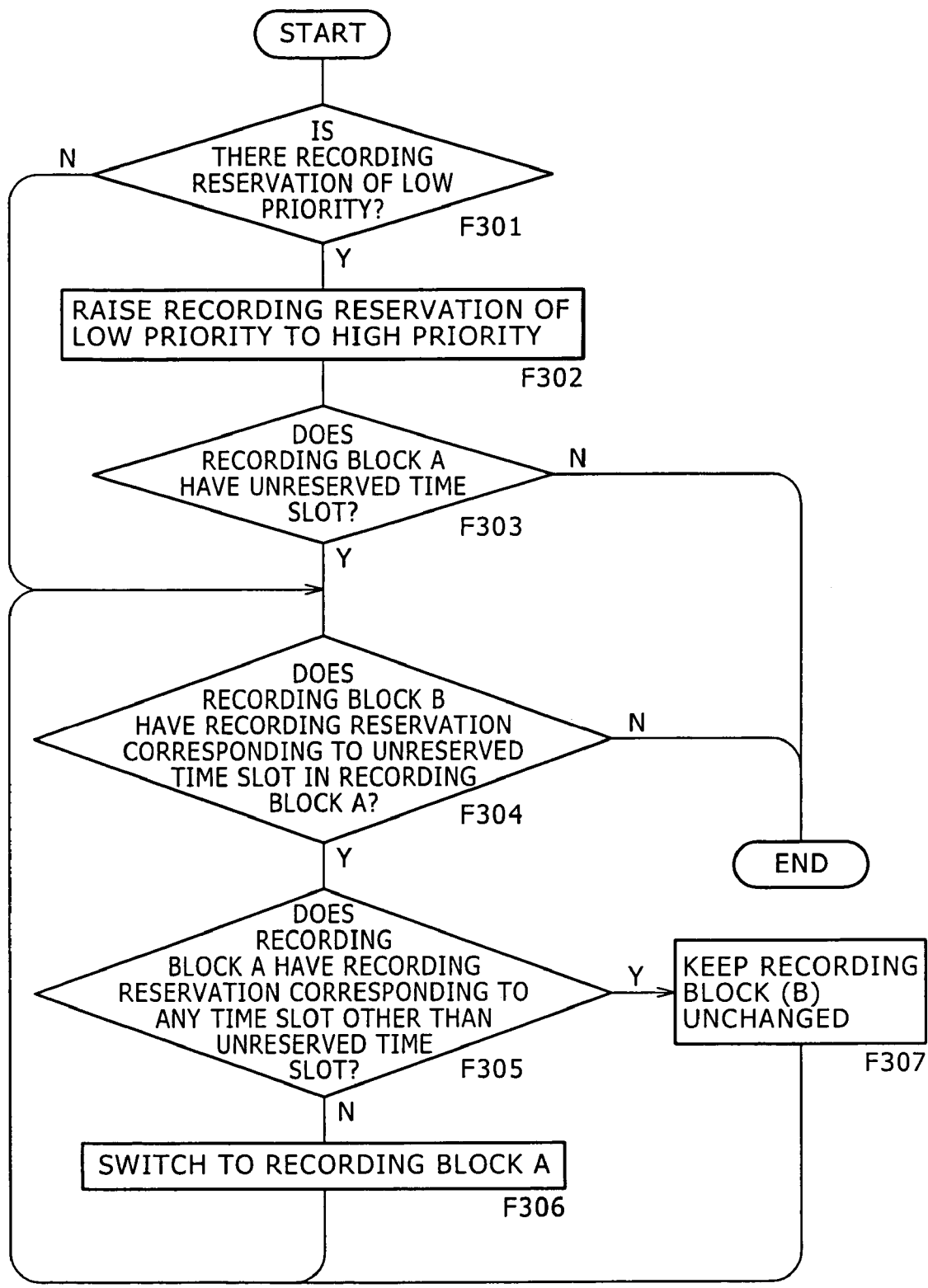
FIG. 14 is a flowchart of steps constituting a priority and recording block switching process performed by the embodiment when a recording reservation is canceled.

If that arrangement is desired, a recording reservation is switched from the recording block B to the recording block A whenever possible preferably not through the process of FIG. 11 but by use of the steps shown in FIG. 14.

That is, if a recording reservation made to the recording block A is canceled for the moment, that reservation could later be brought into effect again by raising to a higher priority its current priority that has been downgraded to implement the cancellation.

The process of FIG. 14, as in the process of FIG. 11, is carried out when a recording reservation assigned to the recording block A is canceled.

In step F301, a check is made to determine whether there exists any recording reservation whose priority is lower than that of the canceled recording reservation. What is verified here is whether there is any recording reservation that might be raised from its current priority to a higher priority to fill in the time slot vacated by the canceled reservation.

If no recording reservation with a lower priority is found in step F301, then step F304 is reached. Steps F304 through F307 are the same as the above-described steps F201 through F204 in FIG. 11 in which the recording blocks may be switched if feasible.

If a recording reservation with its priority lower than that of the canceled recording reservation is found to exist in step F301, then step F302 is reached. In step F302, the detected recording reservation is raised from its current priority to a higher priority.

The recording reservation canceled this time may not be deleted in practice. Instead, the recording reservation in question may be simply downgraded from its current priority to a lower priority in step F302 to bring about the cancellation.

After step F302 is carried out, the state of recording reservations in the recording block A changes. That means there could be a vacant time slot in the recording block A.

If no vacant time slot appears in the recording block A, then the recording block switching process is no longer applicable and is brought to an end. If any vacant time slot appears, steps F304 and subsequent steps are executed so that any recording reservation which has been assigned to the recording block B and whose time slot coincides with the vacated time slot is switched from the recording block B to the recording block A. This process is basically the same as that described in FIG. 11.

Below is a description of the process above in more concrete terms.

FIG. 15A shows the same state of recording reservations as that in FIG. 10B. That is, the recording reservation of the program P7 is made to the recording block A for the time slot of 9:00 PM to 11:30 PM, while the recording reservations of the programs P1, P2, and P3 with a lower priority are also assigned to the same block. The recording reservation of the program P4 is made to the recording block B for the time slot of 9:00 PM to 10:00 PM.

Suppose now that the recording reservation of the program P7 is canceled. In such a case, the recording reservations of the programs P1, P2, and P3 are upgraded from their current priority to a higher priority in step F302 of FIG. 14. At this point, there is no vacant time slot in the recording block A following the cancellation of the recording reservation of the program P7 (or after downgrading of its priority). Thus the process is terminated after step F303. Illustratively, the recording reservation of the program P4 will not be switched from the recording block B to the recording block A.

As a result, the state of FIG. 15A is replaced by the state of FIG. 15B. In this case, the lower-priority recording reservations assigned to the recording block A are simply upgraded to a higher priority for the same block.

Although the program P7 is shown having its priority downgraded in FIG. 15B, this is not limitative of the invention. Alternatively, the recording reservation of the program P7 may be deleted outright.

FIG. 16A shows a state in which the recording reservation of the program P7 is made to the recording block A for the time slot of 9:00 PM to 11:30 PM while the programs P1 and P3 are reserved to the same block with a lower priority for the time slots of 9:00 to 10:00 PM and 11:00 PM to 12:00 PM respectively, and in which the recording reservation of a program P30 is made to the recording block B for a time slot of 10:00 PM to 11:00 PM.

Suppose now that the recording reservation of the program P7 is canceled. In such a case, the recording reservations of the programs P1 and P3 are upgraded from their current priority to a higher priority in step F302 of FIG. 14. At this point, a vacant time slot appears between 10:00 PM and 11:00 PM following the cancellation of the recording reservation of the program P7 (or after downgrading of its priority).

Consequently, step F304 and subsequent steps are carried out to determine whether any recording reservation can be switched to fill in the vacated time slot of 10:00 PM to 11:00 PM. Thus the recording reservation of the program P30 is switched from the recording block B to the recording block A in step F306.

That is, the state of recording reservations shown in FIG. 16A is replaced by the state indicated in FIG. 16B. In the state of FIG. 16B, the recording block B has no reserved time slot.

FIG. 17A shows a state in which the recording reservation of the program P7 is made to the recording block A for the time slot of 9:00 PM to 11:30 PM while the programs P1 and P3 are reserved to the same block with a lower priority for the time slots of 9:00 to 10:00 PM and 11:00 PM to 12:00 PM respectively, and in which the recording reservation of a program P40 is made to the recording block B for a time slot of 10:00 PM to 12:00 PM.

Suppose now that the recording reservation of the program P7 is canceled. In such a case, the recording reservations of the programs P1 and P3 are upgraded from their current priority to a higher priority in step F302 of FIG. 14. At this point, a vacant time slot appears in the recording block A between 10:00 PM and 11:00 PM following the cancellation of the recording reservation of the program P7 (or after downgrading of its priority).

Consequently, step F304 and subsequent steps are carried out to determine whether any recording reservation can be switched to fill in the vacated time slot of 10:00 PM to 11:00 PM. At this point, the time slot of the program P40 is found not only to correspond to but also to exceed the vacant time slot (i.e., the time slot of the program P40 overlaps partially with that of the program P3). Thus step F307 is reached and the recording reservation of the program P40 is not switched.

That is, the state of recording reservations shown in FIG. 17A is replaced by the state indicated in FIG. 17B. In the state of FIG. 17B, the programs with low priority are simply upgraded to a higher priority for the recording block A.

As described, there may be an inventive arrangement whereby the recording reservation of a program with high priority, when canceled, is replaced by the recording reservation of a program with low priority, the latter program's reservation being upgraded from its current priority to high priority to take the place of the canceled reservation. In this case, recording reservations may be switched between the recording blocks only if such changes in priorities are taken into account and found consistent with the result of the eventual switch.

6. Variations

It is to be understood that while the invention has been described in conjunction with a specific embodiment with reference to the accompanying drawings, it is evident that many alternatives, modifications, and variations will become apparent to those skilled in the art in light of the foregoing description.

For example, although the embodiment has been shown equipped with terrestrial analog TV broadcast reception capabilities, this is not limitative of the invention. The embodiment as a video recorder may alternatively contain tuners compatible with analog BS broadcasts as well as digital BS or terrestrial broadcasts. Other tuners may also be incorporated such as those compliant with CATV and other diverse kinds of broadcast options.

A plurality of recording blocks may thus be furnished in the video recorder, each block containing one of various types of tuners. It is entirely feasible to apply this invention to equipment incorporating three or more recording blocks.

Where the video recorder has three or more recording blocks, the processes outlined in FIGS. 11 and 14 above may be carried out only if any recording reservations assigned to multiple recording blocks except for the block having the tuner usually employed for live viewing are canceled.

Although the above-described embodiment of the invention is a video recorder with a storage unit that records broadcast contents, this is not limitative of the invention. Alternatively, the invention may be embodied as a recording apparatus connected to an external recorder such as a HDD or some other disk drive. A recording medium loaded in the connected external recorder is then arranged to record broadcast contents.

Whereas the above embodiment of the invention has been shown as a video recorder for recording broadcast contents, the invention may alternatively be embodied as an audio recorder for recording audio broadcasts. That is, the invention can take diverse forms when implemented to record varying kinds of broadcast contents.

INDUSTRIAL APPLICABILITY

According to the invention, there is provided a recording apparatus capable of simultaneously recording a plurality of broadcast contents without requiring the user to become aware of a plurality of recording blocks inside while carrying out operations to make a recording reservation (of a broadcast program). The user's ease of operation is improved appreciably when recording reservations are to be designated. The user need not be concerned about different recording blocks of the recorder when making recording reservations for the same time slot.

When recording reservations are to be assigned to specific recording blocks, the reservations are established suitably to reflect the status of recording reservations for each of the time slots involved.

If recording reservations are already made to all recording blocks for a particular time slot for which a new recording reservation is desired, the user is asked to make choices: whether to cancel a previous recording reservation to vacate a recording block thereby making room for the new recording reservation, or to renounce the new recording reservation.

The user's preferences are respected in establishing recording reservations; no reservation will be made or canceled against the user's will.

The features above allow the user to perform operations easily in making recording reservations to the recording blocks without confusion. In this manner, the recording capabilities of the recorder are fully taken advantage of.

After a recording reservation is made to a given recording block, the reservation may be switched as needed from the initial recording block to another recording block until the recording starting time of the reservation is reached. This feature makes it possible to rearrange the recording block assignments to reflect the status of other recording reservations after the recording reservation is made until its execution, whereby the recording blocks are optimally assigned in view of the current recording reservation status.

A recording reservation made to a first recording block, when canceled, may be arranged to be replaced automatically by a recording reservation that has been assigned to a second recording block. This arrangement is designed to minimize any recording reservation assigned to the second recording block. Where the second recording block illustratively contains the tuner usually employed for live viewing, the second recording block should preferably be freed from any recording reservation as much as possible for the user's real-time utilization. That is what is accomplished automatically by the arrangement above. The user is thus offered more convenience than ever before. Since the user is not asked to make a recording reservation while being aware of the need to secure the tuner for live viewing, the user's ease of operation is further enhanced.

The invention claimed is:

1. A recording apparatus comprising:
   first through n-th recording means for recording input broadcast contents to a recording medium;
   user interfacing means for inputting an instruction of a user to reserve a recording of a broadcast content; and
   reservation managing means which manages reservations of broadcast content recordings with respect to each of said first through n-th recording means and which, when making a reservation of a broadcast content recording in accordance with the recording reservation instruction input through said user interfacing means, selects automatically one of the first through n-th recording means available for a time slot corresponding to the recording reservation, in order to make said recording reservation to the selected recording means,
   when a time slot corresponding to said recording reservation conflicts with a time slot of a previously made recording reservation because none of the first through n-th recording means is available for the time slot corresponding to said recording reservation, and the recording reservation and the previously made recording reservation are assigned respective priorities by the user, one having a higher priority than the other, performs a process to allocate the time slot to the reservation having the higher priority, and to maintain a record of the reservation having the lower priority,
   when the recording reservation having the higher priority is canceled by the user, performs a process to change priority of the recording reservation having the lower priority to the higher priority and to change priority of the recording reservation that is canceled to a lower priority.

2. The recording apparatus according to claim 1, wherein said user interfacing means performs a selection requesting process for prompting said user to select one of said recording means to which to make said recording reservation.

3. The recording apparatus according to claim 2, wherein, when performing said selection requesting process, said user interfacing means also carries out a process for presenting the time slot applicable to the broadcast content to be reserved for unattended recording, and any previously made recording reservation overlapping either partially or totally with said time slot.

4. The recording apparatus according to claim 2, wherein, if said user selects one of said recording means to which to make said recording reservation in response to said selection requesting process performed by said user interfacing means, then said reservation managing means makes said recording reservation to the user-selected recording means.

5. The recording apparatus according to claim 1, wherein said reservation managing means performs a switching process for automatically switching a recording reservation made to any one of said recording means to another recording means.

6. The recording apparatus according to claim 5, wherein, if a recording reservation made to a particular one of said first through n-th recording means is canceled, then said reservation managing means switches another recording reservation made to another recording means to that particular recording means.

7. A recording reservation processing method for use with a recording apparatus having first through n-th recording means for recording input broadcast contents to a recording medium, said recording reservation processing method comprising the steps of:
    inputting an instruction to reserve a broadcast content recording based on operations by a user;
    automatically selecting from said first through n-th recording means recording means available for a time slot corresponding to the recording reservation designated by said instruction input in the inputting step; and
    making said recording reservation to the recording means selected automatically in the automatically selecting step, said recording reservation being designated by said instruction input in the inputting step,
    when a time slot corresponding to said recording reservation conflicts with a time slot of a previously made recording reservation because none of the first through n-th recording means is available for the time slot corresponding to said recording reservation, and the recording reservation and the previously made recording reservation are assigned respective priorities by the user, one having a higher priority than the other, the time slot is allocated to the reservation having the higher priority, and a record is maintained of the reservation having the lower priority,
    when the recording reservation having the higher priority is canceled by the user, changing priority of the recording reservation having the lower priority to the higher priority and changing priority of the recording reservation that is canceled to a lower priority.

8. The recording reservation processing method according to claim 7, further comprising the steps of:
    requesting that said user select a recording means to which said recording reservation is to be made; and
    if said user selects in the selection requesting step the recording means to which to make said recording reservation, then making said recording reservation a second time to the user-selected recording means.

9. A recording reservation processing method for use with a recording apparatus having first through n-th recording means for recording input broadcast contents to a recording medium, said recording reservation processing method comprising the steps of:
    making a reservation of a broadcast content recording to any one of said first through n-th recording means; and
    switching automatically a recording reservation made to any one of said recording means to another recording means when the time slot corresponding to said recording reservation conflicts with a time slot of a previously made recording reservation for recording onto said another recording means, said previously made recording reservation is canceled, and said recording reservation does not conflict with any other previously made recording reservation for recording to said another recording means;
    when a time slot corresponding to said recording reservation conflicts with a time slot of a previously made recording reservation because none of the first through n-th recording means is available for the time slot corresponding to said recording reservation, and the recording reservation and the previously made recording reservation are assigned respective priorities by a user, one having a higher priority than the other, the time slot is allocated to the reservation having the higher priority, and a record is maintained of the reservation having the lower priority,
    when the recording reservation having the higher priority is canceled by the user, changing priority of the recording reservation having the lower priority to the higher.

* * * * *